(12) United States Patent
Kim

(10) Patent No.: US 9,013,447 B2
(45) Date of Patent: Apr. 21, 2015

(54) METHOD AND DEVICE FOR SENSING CAPACITANCE CHANGE AND RECORDING MEDIUM IN WHICH PROGRAM FOR EXECUTING METHOD IS RECORDED THEREON, AND METHOD AND DEVICE FOR SENSING TOUCH USING METHOD AND RECORDING MEDIUM IN WHICH PROGRAM FOR EXECUTING METHOD IS RECORDED THEREON

(75) Inventor: Ki-Hang Kim, Seongnam-si (KR)

(73) Assignee: Chemtronics Co., Ltd., Yeongi-Gun, Chungcheongnam-Do (KR)

( * ) Notice: Subject to any disclaimer, the term of this patent is extended or adjusted under 35 U.S.C. 154(b) by 201 days.

(21) Appl. No.: 13/808,909

(22) PCT Filed: Jul. 4, 2011

(86) PCT No.: PCT/KR2011/004880
§ 371 (c)(1),
(2), (4) Date: Jan. 7, 2013

(87) PCT Pub. No.: WO2012/005483
PCT Pub. Date: Jan. 12, 2012

(65) Prior Publication Data
US 2013/0113756 A1    May 9, 2013

(30) Foreign Application Priority Data
Jul. 9, 2010  (KR) .......................... 10-2010-0088261

(51) Int. Cl.
G06F 3/044    (2006.01)
G06F 3/041    (2006.01)

(52) U.S. Cl.
CPC .............. *G06F 3/044* (2013.01); *G06F 3/0416* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 2004/0169553 A1* | 9/2004 | Maejima .......................... 330/10 |
| 2005/0134292 A1* | 6/2005 | Knoedgen ....................... 324/658 |
| 2008/0048680 A1* | 2/2008 | Hargreaves et al. ........... 324/686 |
| 2008/0111714 A1* | 5/2008 | Kremin ............................ 341/33 |
| 2009/0045822 A1* | 2/2009 | Nosovitsky et al. .......... 324/686 |
| 2011/0007028 A1* | 1/2011 | Curtis et al. ................... 345/174 |
| 2012/0043970 A1* | 2/2012 | Olson ............................. 324/601 |
| 2012/0113047 A1* | 5/2012 | Hanauer et al. ................ 345/174 |

FOREIGN PATENT DOCUMENTS

| | | |
|---|---|---|
| JP | 2009-042903 A | 2/2009 |
| KR | 10-2006-0051042 A | 5/2006 |
| KR | 10-2009-0004774 A | 1/2009 |
| KR | 10-2009-0055532 A | 6/2009 |

* cited by examiner

*Primary Examiner* — William Boddie
*Assistant Examiner* — Bipin Gyawali
(74) *Attorney, Agent, or Firm* — Revolution IP, PLLC

(57) ABSTRACT

Disclosed are an electrostatic capacity change sensing method and apparatus, and a recording medium in which a program executing the method is recorded, a touch sensing method and apparatus, and a recording medium in which a program executing the method is recorded. The electrostatic capacity change sensing method and apparatus are capable of sensing the change in the electrostatic capacity without using the sensing frequency. The touch sensing method and apparatus are capable of sensing touch without using the sensing frequency.

24 Claims, 13 Drawing Sheets

METHOD AND DEVICE FOR SENSING CAPACITANCE CHANGE AND RECORDING MEDIUM IN WHICH PROGRAM FOR EXECUTING METHOD IS RECORDED THEREON, AND METHOD AND DEVICE FOR SENSING TOUCH USING METHOD AND RECORDING MEDIUM IN WHICH PROGRAM FOR EXECUTING METHOD IS RECORDED THEREON

CROSS REFERENCE TO PRIOR APPLICATIONS

This application is a National Stage Application of PCT International Patent Application No. PCT/KR2011/004880, filed on Jul. 4, 2011, under 35 U.S.C. §371, which claims priority to Korean Patent Application No. 10-2010-0066261, filed on Jul. 9, 2010, which are all hereby incorporated by reference in their entirety.

TECHNICAL FIELD

The present invention relates to an electrostatic capacity change sensing method and apparatus, and a recording medium in which a program executing the method is recorded, a touch sensing method and apparatus, and a recording medium in which a program executing the method is recorded.

BACKGROUND ART

An electrostatic capacitive sensing technology is a technology that uses a change in an electrostatic capacity to sense an external input, a change in external status, and presence of a substance. The electrostatic capacitive sensing technology is used in various fields. For example, the electrostatic capacitive sensing technology is used for a touch sensing apparatus that uses a change in the electrostatic capacity to sense a touch of a user, a level sensing apparatus that uses the change in the electrostatic capacity to sense a level of a substance, or a temperature sensing apparatus that uses the change in the electrostatic capacity to sense a change in a temperature. Hereinafter, the touch sensing apparatus will be described in detail. However, this is for a convenience of the description, but the description with respect to the touch sensing apparatus does not intend to exclude the applicability of the present invention to other fields.

The touch sensing apparatus receives an input of the user through a touch pad (or a touch screen or a touch key). If there is a touch of the user in a touch pad, an electrostatic capacity in the touch pad is increased (alternatively, the touch pad may be designed to decrease the electrostatic capacity in the touch pad if there is a touch of the user). If there is no touch, the electrostatic capacity in the touch pad refers to an electrostatic capacity that is formed between an electrode disposed in the touch pad and a ground. If there is a touch, the electrostatic capacity in the touch pad refers to an electrostatic capacity formed between an electrode disposed in the touch pad, a substance that is used to touch the touch pad (a finger of the user or stylus) and the ground. In other words, the touch sensing apparatus is an input apparatus that is manufactured based on a principle in that a substance used to touch has a higher electrostatic capacity than the air.

The touch sensing apparatus of the related art adopts a method that senses a touch using a sensing frequency. In other words, the touch sensing apparatus of the related art uses a method that generates a waveform having a frequency (hereinafter, referred to as a "sensing frequency") corresponding to an electrostatic capacity in the touch pad, modulates the waveform into a clock, counts the clock, and uses a count value to sense the touch. However, there is a problem in that such a sensing frequency is vulnerable to a CS noise, an RS noise, and a radio noise. For example, due to a phenomenon that a sensing frequency follows a noise frequency, the sensing frequency does not exactly reflect an electrostatic capacity of the touch pad, which causes an error in determining a touch.

In order to solve the above-mentioned problem, engineers spend 70% of development time of a touch sensing apparatus in order to avoid the noise. Further, in order to avoid the noise of the sensing frequency, a method that uses a plurality of frequencies in a sensing section or a method that improves a sensing algorithm is suggested. However, this method has problems in that a cost of the touch sensing apparatus is increased and the structure of the touch sensing apparatus becomes complicated.

DISCLOSURE

Technical Problem

An object of the present invention is to provide electrostatic capacity change sensing method and apparatus that are capable of sensing the change in the electrostatic capacity without using the sensing frequency, and a recording medium in which a program executing the method is recorded.

Also, an object of the present invention is to provide touch sensing method and apparatus that are capable of sensing touch without using the sensing frequency, and a recording medium in which a program executing the method is recorded.

The other objects of the present invention will be easily understood by the description of exemplary embodiments.

Technical Solution

According to an aspect of the present invention for achieving the above-mentioned object, an electrostatic capacity change sensing method is disclosed.

According to an exemplary embodiment of the present invention, a method of sensing a change in an electrostatic capacity in a capacitor to be measured includes: a step of charging a reference capacitor by applying a power supply to the reference capacitor; a step of stopping charging of the reference capacitor when a voltage on the reference capacitor exceeds an upper limit voltage, which is lower than the power supply; a step of sharing a part of charges of the reference capacitor with the capacitor to be measured; a step of discharging at least a part of the charges shared with the capacitor to be measured; a step of repeating at least one of the step of sharing a part of charges of the reference capacitor with the capacitor to be measured and the step of discharging at least a part of the charges shared with the capacitor to be measured; a step of stopping the sharing and the discharging if the reference capacitor is lower than a lower limit voltage; and a step of sensing the change in the electrostatic capacity in the capacitor to be measured using at least one of the number of sharing times and the number of discharging times.

Here, the step of charging the reference capacitor by applying a power supply to the reference capacitor to the step of stopping the sharing and the discharging if the reference capacitor is lower than the lower limit voltage may be controlled by the logical operation on the comparison result of the voltage on the reference capacitor with the upper limit voltage and the comparison result of the voltage on the reference capacitor with the lower limit voltage.

The logical operation may be performed by an SR latch.

Further, the step of charging the reference capacitor by applying a power supply to the reference capacitor may be performed in a status when the discharging of the reference capacitor is blocked.

Further, the step of charging the reference capacitor by applying a power supply to the reference capacitor may include: a step of comparing the voltage on the reference capacitor with the upper limit voltage and the lower limit voltage; a step of inverting a comparison result with the upper limit voltage; a step of logically operating the lower limit voltage and the inverted comparison result with the upper limit voltage; and a step of maintaining the charging of the reference capacitor and the blocking of the reference capacitor from being discharged when the voltage on the reference capacitor is between the upper limit voltage and the lower limit voltage, based on the logical operation result.

Further, the method may include a step of stopping the charging of the reference capacitor and starting sharing the charge between the capacitor to be measured and the reference capacitor and discharging the shared charge, when the voltage on the reference capacitor exceeds the upper limit voltage, based on the logical operation result.

The shared charge may be discharged in a status when the charge is blocked from being shared.

Further, the discharging of the shared charge may be delayed by a passive impedance which is provided on a discharging path of the shared charge.

Further, the step of sharing a part of charges of the reference capacitor with the capacitor to be measured and the step of discharging at least a part of the charges shared with the capacitor to be measured may include: a step of comparing the voltage on the reference capacitor with the upper limit voltage and the lower limit voltage; a step of inverting a comparison result with the upper limit voltage; a step of logically operating the lower limit voltage and the inverted comparison result with the upper limit voltage; and a step of maintaining the sharing of the charge between the capacitor to be measured and the reference capacitor and the discharging of the shared charge and maintaining the blocking of the charge from being supplied to the reference capacitor, when the voltage on the reference capacitor is between the upper limit voltage and the lower limit voltage, based on the logical operation result.

Further, when the voltage on the reference capacitor is lower than the lower limit voltage, based on the logical operation result, the charge sharing between the capacitor to be measured and the reference capacitor and the discharging of the shared charge may be stopped and the charging of the reference capacitor may start in a status when the discharging of the reference capacitor is blocked.

The method may further include a step of counting at least one of the number of sharing times and the number of discharging times. The step of counting at least one of the number of sharing times and the number of discharging times may start by a signal that stops the charging of the reference capacitor.

The method may further include a step of counting at least one of the number of sharing times and the number of discharging times.

The step of counting at least one of the number of sharing times and the number of discharging times may start by a signal that allows the charge to be shared and the shared charge to be discharged.

Before the step of charging the reference capacitor by applying a power supply to the reference capacitor, the method may further include a step of resetting the reference capacitor.

Any one of the above electrostatic capacity change sensing methods may be included in a touch sensing method. In other words, touch may be sensed using any one of the above electrostatic capacity change sensing methods.

According to another aspect of the present invention, an electrostatic capacity change sensing apparatus is provided.

According to an exemplary embodiment of the present invention, the apparatus of sensing a change in an electrostatic capacity in a capacitor to be measured includes: a capacitor to be measured; a reference capacitor; a charging/discharging controller that applies a power supply to the capacitor to be measured and the reference capacitor to charge the reference capacitor and stops charging of the reference capacitor when a voltage on the reference capacitor exceeds an upper limit voltage, which is lower than the power supply, allows the reference capacitor to share a part of charges with the capacitor to be measured, when the voltage on the reference capacitor exceeds the upper limit voltage, in a status when the charge is blocked from being supplied to the reference capacitor, discharges at least a part of the charges which are shared with the capacitor to be measured at least one time, and stops the sharing and the discharging when the voltage on the reference capacitor is lower than the lower limit voltage; and an electrostatic capacity change sensing unit that senses the change in the electrostatic capacity in the capacitor to be measured using at least one of the number of sharing times and the number of discharging times.

Here, the charging/discharging controller may control the charging of the reference capacitor, the sharing of the charge, and the discharging of the shared charge, and the stopping of the sharing and the discharging of the shared charge based on the logical operation on the comparison result of the voltage on the reference capacitor with the upper limit voltage and the comparison result of the voltage on the reference capacitor with the lower limit voltage.

The charging/discharging controller may include an SR latch that performs the logical operation.

Further, the charging/discharging controller may charge the reference capacitor by applying a power supply to the reference capacitor in a status when the discharging of the reference capacitor is blocked.

The charging/discharging controller may compare the voltage on the reference capacitor with the upper limit voltage and the lower limit voltage, invert a comparison result with the upper limit voltage, logically operate the lower limit voltage and the inverted comparison result with the upper limit voltage, and maintain the charging of the reference capacitor and the blocking of the reference capacitor to be discharged when the voltage on the reference capacitor is between the upper limit voltage and the lower limit voltage, based on the logical operation result to charge the reference capacitor.

Further, the charging/discharging controller may stop the charging of the reference capacitor and start sharing the charge between the capacitor to be measured and the reference capacitor and discharging the shared charge, when the voltage on the reference capacitor exceeds the upper limit voltage, based on the logical operation result.

Further, the charging/discharging controller may discharge the shared charge in a status when the sharing of the charge is blocked.

The charging/discharging controller may include a passive impedance that is provided on a discharging path of the shared charge to delay the discharging of the shared charge.

Further, the charging/discharging controller may compare the voltage on the reference capacitor with the upper limit voltage and the lower limit voltage, invert the comparison result with the upper limit voltage, logically operate the lower limit voltage and the inverted comparison result with the upper limit voltage, and maintain the sharing of the charge between the capacitor to be measured and the reference capacitor and the discharging of the shared charge and maintain the blocking of the charge from being supplied to the reference capacitor, when the voltage on the reference capacitor is between the upper limit voltage and the lower limit voltage, based on the logical operation result to share a part of charges of the reference capacitor with the capacitor to be measured and discharge at least a part of the charges shared with the capacitor to be measured.

Further, when the voltage on the reference capacitor is lower than the lower limit voltage, based on the logical operation result, the charging/discharging controller may stop sharing charges between the capacitor to be measured and the reference capacitor and the discharging of the shared charge and start the charging of the reference capacitor in a status when the discharging of the reference capacitor is blocked.

Further, the charging/discharging controller may further include a counter that counts at least one of the number of sharing times and the number of discharging times, and the counter may be enabled by a signal that stops the charging of the reference capacitor.

Further, the charging/discharging controller may further include a counter that counts at least one of the number of sharing times and the number of discharging times, and the counter may be enabled by a signal that shares the charge and discharge the shared charge.

The charging/discharging controller may reset the reference capacitor before charging the reference capacitor.

Any one of the above electrostatic capacity change sensing apparatuses may be included in a touch sensing apparatus. In other words, a touch sensing apparatus may be implemented by using any one of the above electrostatic capacity change sensing apparatuses.

According to another aspect of the present invention, a recording medium in which a program that implements the electrostatic capacity change sensing method is recorded is provided.

According to an exemplary embodiment of the present invention, a recording medium in which a program that implements a method of sensing a change in an electrostatic capacity in a capacitor to be measured is recorded is provided. The method includes a step of charging a reference capacitor by applying a power supply to the reference capacitor; a step of stopping charging of the reference capacitor when a voltage on the reference capacitor exceeds an upper limit voltage, which is lower than the power supply; a step of sharing a part of charges of the reference capacitor with the capacitor to be measured; a step of discharging at least a part of the charges shared with the capacitor to be measured; a step of stopping the sharing and the discharging when the voltage on the reference capacitor is lower than the lower limit voltage; and a step of sensing the change in the electrostatic capacity in the capacitor to be measured using the number of sharing times and the number of discharging times. Here, the step of sharing and the step of discharging are repeated at least one time.

Here, the step of charging the reference capacitor by applying a power supply to the reference capacitor to the step of stopping the sharing and the discharging when the reference capacitor is lower than the lower limit voltage may be controlled by a logical operation on the comparison result of the voltage on the reference capacitor with the upper limit voltage and the comparison result of the voltage on the reference capacitor with the lower limit voltage.

The logical operation may be performed by an SR latch.

Further, the step of charging a reference capacitor by applying a power supply to the reference capacitor may be performed in a status when the discharging of the reference capacitor is blocked.

Further, the step of charging the reference capacitor by applying a power supply to the reference capacitor may include: a step of comparing the voltage on the reference capacitor with the upper limit voltage and the lower limit voltage; a step of inverting a comparison result with the upper limit voltage; a step of logically operating the lower limit voltage and the inverted comparison result with the upper limit voltage; and a step of maintaining the charging of the reference capacitor and maintaining the blocking of the reference capacitor to be discharged when the voltage on the reference capacitor is between the upper limit voltage and the lower limit voltage, based on the logical operation result.

Further, the method may include a step of stopping the charging of the reference capacitor and starting sharing the charge between the capacitor to be measured and the reference capacitor and discharging the shared charge, when the voltage on the reference capacitor exceeds the upper limit voltage, based on the logical operation result.

The shared charge may be discharged in a status when the charge is blocked from being shared.

Further, the discharging of the shared charge may be delayed by a passive impedance which is provided on a discharging path of the shared charge.

Further, the step of sharing a part of charges of the reference capacitor with the capacitor to be measured and the step of discharging at least a part of the charges shared with the capacitor to be measured may include: a step of comparing the voltage on the reference capacitor with the upper limit voltage and the lower limit voltage; a step of inverting a comparison result with the upper limit voltage; a step of logically operating the lower limit voltage and the inverted comparison result with the upper limit voltage; and a step of maintaining the sharing of the charge between the capacitor to be measured and the reference capacitor and the discharging of the shared charge and maintaining the blocking of the charge from being supplied to the reference capacitor, when the voltage on the reference capacitor is between the upper limit voltage and the lower limit voltage, based on the logical operation result.

Further, when the voltage on the reference capacitor is lower than the lower limit voltage, based on the logical operation result, the sharing of the charge between the capacitor to be measured and the reference capacitor and the discharging of the shared charge may be stopped and the charging of the reference capacitor may start in a status when the discharging of the reference capacitor is blocked.

The method may further include a step of counting at least one of the number of sharing times and the number of discharging times. The step of counting at least one of the number of sharing times and the number of discharging times may start by a signal that stops the charging of the reference capacitor.

The method may further include a step of counting at least one of the number of sharing times and the number of discharging times.

The step of counting at least one of the number of sharing times and the number of discharging times may start by a signal that allows the charge to be shared and discharges the shared charge.

Before the step of charging the reference capacitor by applying a power supply to the reference capacitor, the method may further include a step of resetting the reference capacitor.

Any one of the above electrostatic capacity change sensing methods may be included in a touch sensing method. In other words, touch may be sensed using any one of the above electrostatic capacity change sensing methods.

Advantageous Effects

As described above, according to electrostatic capacity change sensing method and apparatus, and a recording medium in which a program executing the method is recorded, the change in the electrostatic capacity is sensed by using the number of sharing times if a charge or the number of discharging times of the shared charge rather than a sensing frequency to exclude an influence by the noise when the change in the electrostatic capacity is sensed.

Further, according to electrostatic capacity change sensing method, and apparatus, and a recording medium in which a program executing the method is recorded, the change in the electrostatic capacity is sensed by using the number of system clocks in a charge sharing section rather than a sensing frequency to exclude an influence by the noise when the change in the electrostatic capacity is sensed.

Furthermore, according to touch sensing method and apparatus, and a recording medium in which a program executing the method is recorded, the touch is sensed by using the number of sharing times of a charge, the number of discharging times of the shared charge, or the number of system clocks rather than a sensing frequency to exclude an influence by the noise when the touch is sensed.

MODE FOR CARRYING OUT THE INVENTION

Figure 1:
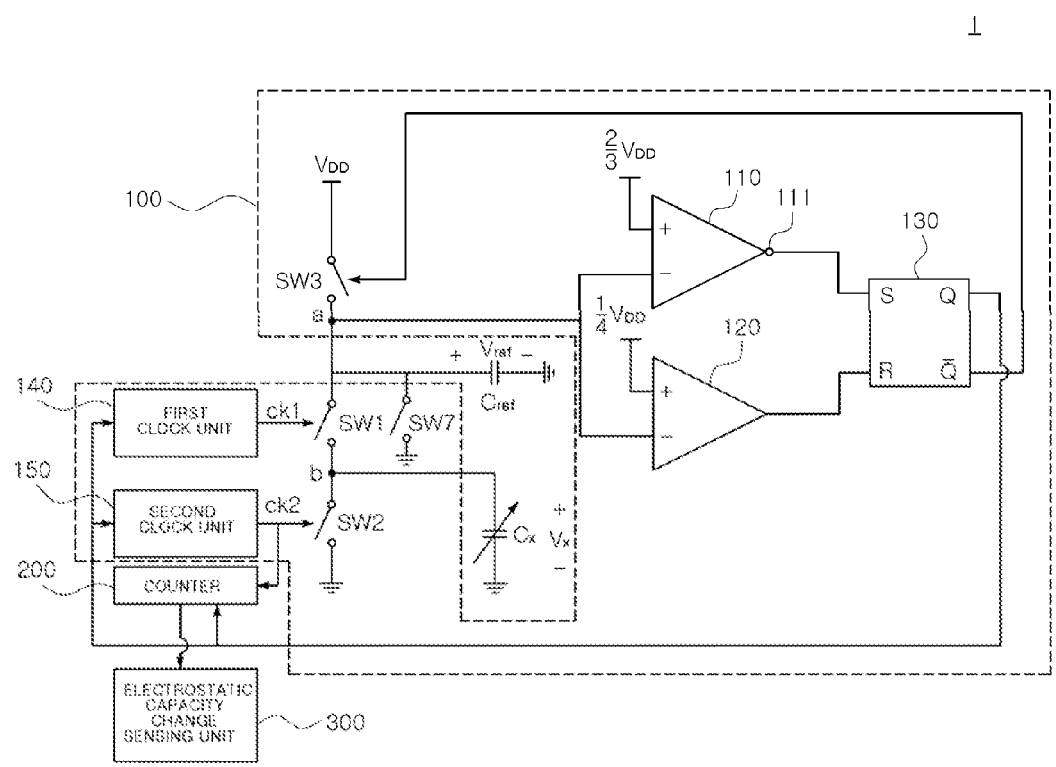
FIG. 1 is a circuit diagram illustrating a configuration of an electrostatic capacity change sensing apparatus according to an exemplary embodiment of the present invention.

The present invention may have various modifications and various exemplary embodiments and specific exemplary embodiments will be illustrated in the drawings and described in detail in the detailed description. However it should be understood that the invention is not limited to the specific embodiments, but includes all changes, equivalents, or alternatives which are included in the spirit and technical scope of the present invention.

In the figures, like reference numbers refer to the same or equivalent parts of the present invention throughout the several figures of the drawing. However, if it is considered that description of related known configuration or function may cloud the gist of the present invention, the description will be omitted.

Terminologies such as first or second may be used to describe various components but the components are not limited by the above terminologies. The above terminologies are used only to discriminate one component from the other component.

For example, without departing from the scope of the present invention, a first component may be referred to as a second component, and similarly, a second component may be referred to as a first component.

A term of and/or includes combination of a plurality of related elements or any one of the plurality of related elements.

It should be understood that, when it is described that an element is "coupled" or "connected" to another element, the element may be "directly coupled" or "directly connected" to the another element or "coupled" or "connected" to the another element through a third element.

In contrast, it should be understood that, when it is described that an element is "directly coupled" or "directly connected" to another element, it is understood that no element is not present between the element and the another element.

Terms used in the following description are used to describe a specific exemplary embodiment but are not intended to limit the present invention.

A singular form may include plural form if there is no clearly opposite meaning in the context. In the present invention, it should be understood that terms "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art.

Terms which are defined in a generally used dictionary should be interpreted to have the same meaning as the meaning in the context of the related art but are not interpreted as an ideally or excessively formal meaning if it is not clearly defined in the present invention.

The term "sensing of change in an electrostatic capacity" used in the following description may include a meaning of "measuring of an electrostatic capacity". In other words, an absolute electrostatic capacity of a capacitor Cx to be measured may be measured using a "count value" which will be described below. Further, a relative electrostatic capacity may be measured using the "count value". Such sensing of change in the electrostatic capacity may be applied to the measurement of touch, a temperature, and a level, touch sensing, temperature change sensing, level sensing.

First, referring to FIG. 1, a principle of sensing the change in the electrostatic capacity in the present invention will be described.

FIG. 1 is a circuit diagram illustrating a configuration of an electrostatic capacity change sensing apparatus according to an exemplary embodiment of the present invention.

The present invention may sense the change in the electrostatic capacity using a charge sharing method (or charge transferring technology). Referring to FIG. 1, a reference capacitor Cref is charged to a predetermined upper limit voltage (VDD2/3). Using a capacitor Cx to be measured, the charges charged in the reference capacitor Cref is discharged to a predetermined lower limit voltage VDD1/4. In order to discharge the reference capacitor Cref to the lower limit voltage 1/4VDD, the discharging may be performed by the capacitor Cx to be measured at least one time or more. In this case, the number of discharging times may be varied depending on the electrostatic capacity of the capacitor Cx to be measured. In other words, as the electrostatic capacity of the capacitor Cx to be measured becomes larger, the reference capacitor Cref may reach the lower limit voltage 1/4VDD by the smaller number of discharging times. Therefore, the change in the electrostatic capacity may be sensed using the number of discharging times of the reference capacitor Cref using the capacitor Cx to be measured. In the above description, the upper limit voltage VDD2/3 and the lower limit voltage VDD1/4 are only illustrative for the convenience of the description, but the value does not limit the scope of the present invention. The upper limit voltage VDD2/3 or the lower limit voltage VDD1/4 may be any one of a positive voltage, a negative voltage, and "0". Further, the upper limit voltage VDD2/3 may be a voltage which is lower than a power supply VDD.

Hereinafter, referring to FIG. 1, a structure and an operation of the electrostatic capacity change sensing apparatus of the present invention will be specifically described.

Referring to FIG. 1, the electrostatic capacity change sensing apparatus 1 according to an exemplary embodiment of the present invention may include the reference capacitor Cref, the capacitor Cx to be measured, a charging/discharging controller 100, a counter 200, and an electrostatic capacity change sensing unit 300.

The reference capacitor Cref may have an electrostatic capacity which is arbitrarily set by a designer. The reference capacitor Cref is preferably selected to have a larger electrostatic capacity than that of the capacitor Cx to be measured. Therefore, more charges are charged in the reference capacitor Cref so that the number of discharging times by the capacitor Cx to be measured may be increased. Accordingly, the electrostatic capacity of the reference capacitor Cref is set to be larger than that of the capacitor Cx to be measured so that a higher resolution may be provided.

The electrostatic capacity of the capacitor Cx to be measured may be changed by an external environmental change. The external environmental change may include touch by a user, approach of a substance, or a temperature change In other words, the external environmental change may include all factors that may trigger change in the electrostatic capacity of the capacitor Cx to be measured.

If the electrostatic capacity change sensing apparatus 1 is applied to a touch sensing apparatus, the electrostatic capacity of the capacitor Cx to be measured may be equivalent to the electrostatic capacity in a touch pad.

Further, if the electrostatic capacity change sensing apparatus 1 is applied to a level sensing apparatus, the electrostatic capacity of the capacitor Cx to be measured may be equivalent to the electrostatic capacity in an electrode which is provided to sense a level.

Further, if the electrostatic capacity change sensing apparatus 1 is applied to a temperature sensing apparatus, the electrostatic capacity of the capacitor Cx to be measured may be equivalent to the electrostatic capacity in an electrode which is provided at a predetermined position to provide change in the electrostatic capacity in accordance with the change in temperature.

The touch sensing apparatus, the level sensing apparatus, and the temperature sensing apparatus are only illustrative and the capacitor Cx to be measured may be equivalent to any one of all elements whose electrostatic capacity is changed in accordance with the external environmental change.

The charging/discharging controller 100 may control charging and discharging of the reference capacitor Cref and the capacitor Cx to be measured. The charging/discharging controller 100 may include a first comparator 110, a second comparator 120, an SR latch 130, a first clock unit 140, a second clock unit 150, a first switch sw1, a second switch sw2, a third switch sw3, and a seventh switch sw7.

An inverting input terminal (−) of the first comparator 110 may be connected to a positive electrode of the reference capacitor Vref via a node a. A non-inverting input terminal (+) of the first comparator 110 may be connected to the upper limit voltage 2/3VDD. An inverter 111 may be connected to an output terminal of the first comparator 110.

Therefore, if a voltage Vref at the reference capacitor Cref is lower than the upper limit voltage 2/3VDD, the first comparator 110 may output a high level signal (a logic "1"). In contrast, if the voltage Vref at the reference capacitor Cref is higher than the upper limit voltage 2/3VDD, the first comparator 110 may output a low level signal (a logic "0"). The outputs may be inverted by the inverter 111.

Differently from those illustrated in FIG. 1, the positive electrode of the reference capacitor Vref is connected to the non-inverting input terminal (+) of the first comparator 110 and the upper limit voltage 2/3VDD is connected to the inverting input terminal (−) of the first comparator 110 so that the inverter 110 may be omitted.

Hereinafter, the logic "1" is denoted by "1" and "1" may be an arbitrary voltage which is set by the designer. Further, the logic "0" is denoted by "0" and "0" may be an arbitrary voltage which is set by the designer.

An inverting input terminal (−) of the second comparator 120 may be connected to the positive electrode of the reference capacitor Vref via a node a. A non-inverting input terminal (+) of the second comparator 120 may be connected to the lower limit voltage 1/4VDD.

Therefore, if a voltage Vref at the reference capacitor Cref is lower than the lower limit voltage 1/4VDD, the second comparator 120 may output a high level signal (a logic "1"). In contrast, if the voltage Vref at the reference capacitor Cref is higher than the lower limit voltage 1/4VDD, the second comparator 120 may output a low level signal (a logic "0").

Differently from those illustrated in FIG. 1, the positive electrode of the reference capacitor Vref may be connected to the non-inverting input terminal (+) of the second comparator 120, the lower limit voltage 1/4VDD may be connected to the inverting input terminal (−), and an inverter may be connected to an output terminal of the second comparator 120.

A set input terminal S of the SR latch 130 may be connected to the output terminal of the first comparator 110 through the inverter 111 and a reset input terminal R of the SR latch 130 may be connected to the output terminal of the second comparator 120. By the known operation principle, the SR latch 130 may generate outputs corresponding to the inputs to the set input terminal S and the reset input terminal R.

Specifically, the SR latch 130 outputs Q=1 and Q'=0 when S=1 and R=0. If the status is transited from a state when Q=1 and Q'=0 to a state when S=0 and R=0, the previous output (Q=1 and Q'=0) may be maintained. Further, the SR latch 130 outputs Q=0 and Q'=1 when S=0 and R=1. If the status is transited from a state when Q=0 and Q'=1 to a state when S=0 and R=0, the previous output (Q=0 and Q'=1) may be maintained. The outputs Q and Q' of the SR latch 130 may be used as a signal that controls the charging and discharging of the reference capacitor Cref and the capacitor Cx to be measured, which will be specifically described below.

If a normal output Q of the SR latch 130 is 1, the first clock unit 140 is enabled to output a clock ck1 that turns on/off the first switch sw1.

If a normal output Q of the SR latch 130 is 1, the second clock unit 150 is enabled to output a clock ck2 that turns on/off the second switch sw2.

The first switch sw1 may be turned on/off by the clock ck1 of the first clock unit 140. For example, if the first switch sw1 receives a high level at the clock ck1, the first switch sw1 may be turned on. In contrast, if the first switch sw1 receives a low level at the clock ck1, the first switch sw1 may be turned off.

When the first switch sw1 is turned on, the charge which is charged in the reference capacitor Cref may be shared with the capacitor Cx to be measured via the first switch sw1. If the first switch sw1 is turned off, the movement (or sharing) of the charge between the reference capacitor Cref and the capacitor Cx to be measured may be blocked. The first switch sw1 may be formed of a field effect transistor (for example, MOSFET). However, if a switch is controlled to be turned on/off by the high level/low level of the clock ck1, the switch may come within the scope of the first switch sw1 of the present invention.

The second switch sw2 may be turned on/off by the clock ck2 of the second clock unit 150. For example, if the second switch sw2 receives a high level at the clock ck2, the second switch sw2 may be turned on. In contrast, if the second switch sw2 receives a low level at the clock ck2, the second switch sw2 may be turned off.

If the second switch sw1 is turned on, the charges which are charged in the capacitor Cx to be measured may be discharged via the second switch sw2. If the second switch sw2 is turned off, the discharging of the capacitor Cx to be measured may be stopped. The second switch sw2 may be formed of a field effect transistor (for example, MOSFET). However, if a switch is controlled to be turned on/off by the high level/low level of the clock ck2, the switch may come within the scope of the second switch sw2 of the present invention.

The seventh switch sw7 may be connected with the reference capacitor Cref and the first switch sw1 in parallel. If the seventh switch sw7 is turned on, the reference capacitor Cref may be discharged (or reset). As known in the art, if an initial input is S=0 and R=0, even though a subsequent input is a set input (S=1 and R=0) or a reset input (S=0 and R=1), a status of the SR latch 130 is not changed. According to circumstances, in a status when a power supply is applied to the electrostatic capacity change sensing apparatus 1 to be initialized, the voltage Vref at the reference capacitor Cref may be positioned between the upper limit voltage 2/3 VDD and the lower limit voltage 1/4 VDD. This may occur when the electrostatic capacity change sensing apparatus 1 is turned off and then turned on in a status when the voltage Vref at the reference capacitor Cref may be positioned between the upper limit voltage 2/3 VDD and the lower limit voltage 1/4 VDD. Therefore, if the power supply is applied to the electrostatic capacity change sensing apparatus 1, as an initial operation, the seventh switch sw7 may be turned on to discharge (or reset) the reference capacitor Cref. The seventh switch sw7 may be turned on or off by an arbitrary control signal (not illustrated) which is set as an initialization condition. In other words, if the power supply is applied to the electrostatic capacity change sensing apparatus 1, the seventh switch sw7 may be turned on only for a predetermined time to discharge (or reset) the reference capacitor Cref.

In FIG. 1, one terminal of the reference capacitor Cref, one terminal of the capacitor Cx to be measured, one terminal of the second switch sw2 and one terminal of the seventh switch sw7 are connected to the ground. Differently from the above, one terminal of the reference capacitor Cref, one terminal of the capacitor Cx to be measured, one terminal of the second switch sw2 and one terminal of the seventh switch sw7 may be connected to a predetermined reference voltage. Further, one terminal of the second switch sw2 and one terminal of the seventh switch sw7 may be connected to an arbitrary voltage source or a current source to discharge the capacitor Cx to be measured.

The third switch sw3 may be turned on/off by a complementary output Q' of the SR latch 130. Specifically, if the complementary output Q' of the SR latch 130 is "1", the third switch sw3 may be turned on. In contrast, if the complementary output Q' of the SR latch 130 is "0", the third switch sw3 may be turned off.

If the third switch sw3 is turned on, the reference capacitor Cref may be charged by the voltage source VDD. The third switch sw3 may be formed of a field effect transistor (for example, MOSFET). However, if a switch is controlled to be turned on/off by the complementary output Q', the switch may come within the scope of the second switch sw2 of the present invention.

The counter 200 may receive the clock ck2 of the second clock unit 150 and count the received clock. By doing this, the number of discharging times (or sharing times) while the reference capacitor Cref is discharged from the upper limit voltage 2/3VDD to the lower limit voltage 1/4VDD may be counted. In this case, a count enable section where the counting is performed may be controlled by the normal output Q of the SR latch 130. In other words, the counter 200 may be enabled by the normal output Q (=1) to count the clock ck2 of the second clock unit 150. Further, the counter 200 may be disabled by the normal output Q (=0) to stop counting. Further, the counter 200 may transmit the count value to the electrostatic capacity change sensing unit 300 in accordance with the normal output Q (=0).

The electrostatic capacity change sensing unit 300 may sense the change in the electrostatic capacity using the count value in the counter 200. For example, if the electrostatic capacity of the capacitor Cx to be measured is increased, the count value may be decreased. The electrostatic capacity change sensing unit 300 may sense the decrease in the count value to sense the change in the electrostatic capacity in the capacitor Cx to be measured. Alternatively, the electrostatic capacity change sensing unit 300 may calculate an absolute electrostatic capacity of the capacitor Cx to be measured using the count value as a function.

FIG. 1 illustrates an exemplary embodiment that senses the change in the electrostatic capacity using a differential method. Alternatively, the change in the electrostatic capacity may be sensed using an integral method. In this case, a passive impedance may be provided in a charge sharing path between the reference capacitor Cref and the capacitor Cx to be measured. The first switch sw1 may be switched until the capacitor Cx to be measured is charged to a predetermined voltage. The switching number of the first switch sw1 until the capacitor Cx to be measured is charged to a predetermined voltage may be counted. The change in the electrostatic capacity of the capacitor Cx to be measured may be sensed using the counted value. In this case, the second switch sw2 may be used to reset the capacitor Cx to be measured after charging the capacitor Cx to be measured to the predetermined voltage.

When the electrostatic capacity change sensing apparatus described above may be applied to the touch sensing apparatus, the touch sensing apparatus may sense the change in the electrostatic capacity and determine whether to be touched using the change in the electrostatic capacity. For example, if the electrostatic capacity Cx in the touch pad is increased by the touch, the count value in the counter 200 may be decreased. Therefore, if the count value is decreased to a predetermined value or higher, the touch sensing apparatus may determine that there is touch. The touch sensing apparatus may read a coordinate where the touch is performed using the count value.

Further, when the electrostatic capacity change sensing apparatus described above may be applied to the level sensing apparatus, as a substance approaches an electrode provided in the level sensing apparatus, the electrostatic capacity Cx in the electrode may be increased. In this case, if the count value is decreased to a predetermined value or higher, the level sensing apparatus may determine that a level of the substance approaches the electrode. In this case, the level sensing apparatus may calculate a level of the substance using the count value.

Further, when the electrostatic capacity change sensing apparatus described above is applied to the temperature sensing apparatus, as a temperature around an electrode provided in the temperature sensing apparatus is raised, the electrostatic capacity Cx in the electrode may be increased. In this case, the temperature sensing apparatus may sense the temperature change using the change in the count value. Alternatively, the temperature sensing apparatus may calculate a temperature using the count value.

Hereinafter, referring to FIGS. 1 and 2, a specific operation of the electrostatic capacity change sensing apparatus in accordance with the status in the electrostatic capacity change sensing apparatus of FIG. 1 will be described. By the following description, the operation of the electrostatic capacity change sensing apparatus of FIG. 1 will be clearer.

Figure 2:
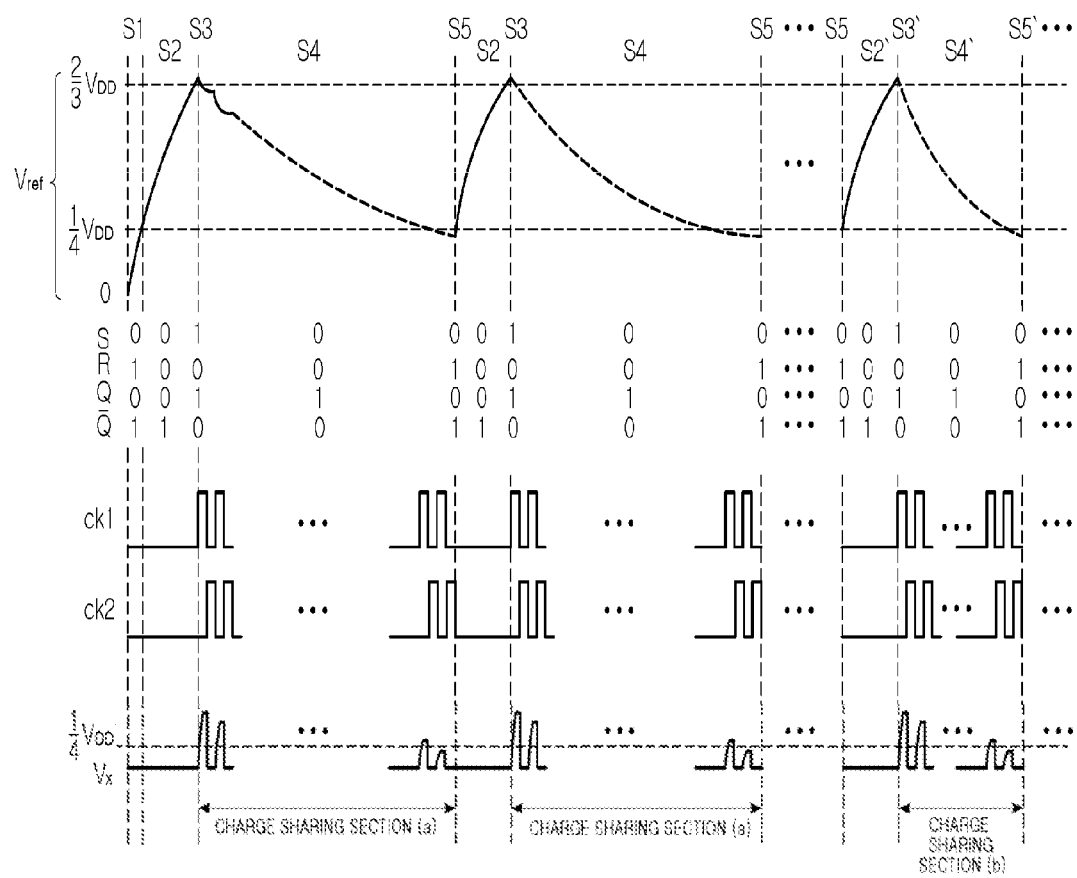
FIG. 2 is a timing chart illustrating an operation of the electrostatic capacity change apparatus of FIG. 1.

FIG. 2 is a timing chart illustrating an operation of the electrostatic capacity change sensing apparatus of FIG. 1. Hereinafter, for the convenience of the description, the status of the electrostatic capacity change sensing apparatus will be described. Further, for the convenience of the description, the repeated matters to the above-described matters will be omitted or briefly described.

First Status S1

First, it is assumed that the reference capacitor Cref is reset prior to the first status S1. Since a voltage Vref of the reset reference capacitor Cref is "0", the first comparator 110 may output a high level 1. The set input terminal S of the SR latch 130 may receive "0" via the inverter 111. Since the voltage Vref of the reference capacitor Cref is "0", the second comparator 110 may output a high level 1. By doing this, the reset input terminal R of the SR latch 130 may receive "1". Therefore, the output of the SR latch 130 may be Q=0 and Q'=1. In the first status S1 when the voltage Vref of the reference capacitor Cref is "0" and the lower limit voltage 1/4 VDD, the output of the SR latch 130 may be maintained at Q=0 and Q'=1. Since Q'=1, the third switch sw3 may be turned on.

Therefore, the reference capacitor Cref may be charged to the lower limit voltage 1/4VDD by the voltage source VDD in the first status S1. In this case, since Q=0, the first switch sw1 and the second switch sw2 may be turned off.

Second Status S2

In the second status S2, the voltage Vref in the reference capacitor Cref may be positioned between the lower limit voltage 1/4VDD and the upper limit voltage 2/3VDD. Therefore, the first comparator 110 outputs "1" so that the set input terminal S of the SR latch 130 may receive "0". Also, the second comparator 120 outputs "0" so that the reset input terminal R of the SR latch 130 may receive "0". In accordance with the operation principle of the SR latch 130 which is described above, the SR latch 130 may maintain Q=0 and Q'=1 in the first status.

Therefore, the reference capacitor Cref may be charged to the upper limit voltage 2/3VDD by the voltage source VDD in the second status S2. In this case, since Q=0, the first switch sw1 and the second switch sw2 may be turned off.

Third Status S3

In the third status S3, the voltage Vref in the reference capacitor Cref may be higher than the upper limit voltage 2/3VDD. Therefore, the first comparator 110 outputs "0" so that the set input terminal S of the SR latch 130 may receive "1". Therefore, the second comparator 120 outputs "0" so that the reset input terminal R of the SR latch 130 may receive "0". Therefore, the SR latch 130 may output Q=1 and Q'=0.

As soon as the voltage Vref in the reference capacitor Cref exceeds the upper limit voltage 2/3VDD, Q'=0, and thus the third switch sw3 is turned off. Therefore, the reference capacitor Cref may be charged to a value which is very approximate to the upper limit voltage 2/3VDD. Since Q=1, the first clock unit 140 and the second clock unit 150 become enabled. That is, if Q=1, the first clock unit 140 and the second clock unit 150 may output the clocks ck1 and ck2, respectively. By doing this, the charge on the reference capacitor Cref may start being shared with the capacitor Cx to be measured and the charge on the capacitor Cx to be measured may start being discharged, which will be specifically described in a fourth status S4. Corresponding to Q=1, the counter 200 may also be enabled.

Fourth Status S4

In this case, the voltage Vref on the reference capacitor Cref may be positioned between the upper limit voltage 2/3VDD and the lower limit voltage 1/4VDD. Therefore, the set input terminal S of the SR latch 130 may receive "0" and the reset input terminal R of the SR latch 130 may receive "0". Accordingly, in the fourth status S4, the SR latch 130 may maintain a status of Q=1 and Q'=0. If the first switch sw1 is turned on by the high level of the clock ck1, the charge on the reference capacitor Cref may be shared with the capacitor Cx to be measured. The charge on the reference capacitor Cref is decreased by the sharing, so that the voltage Vref on the reference capacitor Cref may be decreased.

After sharing the charge, in accordance with the low level of the clock ck1, the first switch sw1 may be turned off and in accordance with the high level of the clock ck2, the second switch sw2 may be turned on. Therefore, the charge which is charged in the capacitor Cx to be measured via the second switch sw2 may be discharged. In this case, the third switch sw3 and the first switch sw1 are turned off, so that the charge on the reference capacitor Cref may be maintained. FIG. 2 illustrates that all charges on the capacitor Cx to be measured are discharged in the section where the clock ck2 is a high level. However, by adjusting a time when the clock ck2 is maintained at a high level, some or all of the charges which are charged on the capacitor Cx to be measured may be adjusted to be discharged.

As described above, when the first switch sw1 is turned on, the second switch sw2 is turned off, and the third switch sw3 is turned off, the charge on the reference capacitor Cref may be shared with the capacitor Cx to be measured. In contrast, when the first switch sw1 is turned off, the second switch sw2 is turned on, and the third switch sw3 is turned off, the charge on the capacitor Cx to be measured may be discharged.

As the charge on the reference capacitor Cref is repeatedly shared with the capacitor Cx to be measured and the charge on the capacitor Cx to be measured is repeatedly discharged, the voltage Vref on the reference capacitor Cref may be decreased. In order to simplify the drawings, only for two high levels of the clocks ck1 and ck2, the voltage Vref on the reference capacitor Cref is illustrated in detail and the other sections are represented with dot lines. Even in other sections, the voltage Vref on the reference capacitor Cref may be decreased when the clock ck1 is high level and maintained in a section where the clock ck2 is high level. The number of charging and discharging times for the capacitor Cx to be measured may be one or more.

During the charge sharing section a, the counter 200 is enabled by Q=1 so as to count the number of sharing times of the charge on the reference capacitor Cref with the capacitor Cx to be measured or the number of discharging times of the charge on the capacitor Cx to be measured, which may be performed when the counter 200 counts the clock ck1 or the clock ck2 during the charge sharing section a.

Here, frequencies of the clocks ck1 and ck2 may be different from each other. The order of the clocks ck1 and ck2 may be reversed. However, differently from FIG. 2, if the high level of the clock ck2 is applied first, all charges on the capacitor Cx to be measured are discharged so that the capacitor Cx to be measured may be reset. Therefore, at the terminal of the charge sharing section, regardless of whether the charge remains on the capacitor Cx to be measured, the electrostatic capacity change may be measured under the same condition. In order to reset the capacitor Cx to be measured, a clock ck2 which is first applied simultaneously with the start of the charge sharing section a is preferably maintained at a high level during a sufficient time to discharge all charges on the capacitor Cx to be measured.

Fifth Status S5

As the charge on the reference capacitor Cref is continuously shared with the capacitor Cx to be measured and the charge on the capacitor Cx to be measured is continuously discharged, the voltage Vref on the reference capacitor Cref may become lower than the lower limit voltage. In this case, the set input terminal S of the SR latch 130 may receive "0". Further, the reset input terminal R of the SR latch 130 may receive "1". By doing this, the output of the SR latch 130 may be Q=0 and Q'=1. Since Q=0, the first clock unit 140 and the second clock unit 150 are disabled to stop outputting the clocks ck1 and ck2, respectively. Further, in accordance with the transition from Q=1 to Q=0, the counter 200 counts the clock ck1 or ck2 during a charge sharing section to transmit the created count value to the electrostatic capacity change sensing unit 300. Since Q'=1, the third switch sw3 may be turned on. By doing this, as soon as the reference capacitor Cref reaches the lower limit voltage 1/4VDD, the reference capacitor Cref may start charging.

With the above principles, the status change of the electrostatic capacity repeats S2 to S5. In other words, the voltage Vref on the reference capacitor Cref is repeatedly charged and discharged between the upper limit voltage 2/3VDD and the lower limit voltage 1/4VDD. Further, the electrostatic capacity change sensing unit 300 may sense whether the electrostatic capacity is changed using the count value of the clock ck1 or ck2 during the charge sharing section a.

If the electrostatic capacity change sensing apparatus 1 is applied to the touch sensing apparatus, whether to be touched may be determined using the count value of the clock ck1 or ck2 and a coordinate where the touch is performed may be determined. For example, S1', S2', S3', S4' and S5' may be sections where the touch is performed. When the touch is performed, the electrostatic capacity of the capacitor Cx to be measured may be increased. Therefore, whenever the charge is shared with the capacitor Cx to be measured, more charges on the reference capacitor Cref may move to the capacitor Cx to be measured. Accordingly, if the electrostatic capacity of the capacitor Cx to be measured is increased, the charges on the reference capacitor Cref may be more rapidly decreased. In other words, the voltage Vref at the reference capacitor Cref may be more rapidly lowered. By doing this, a charge sharing period b may be shortened. Further, the count value at the clock ck1 or ck2 in the charge sharing period b may be lowered. By the change in the count value, the touch sensing apparatus may determine whether to be touched.

If the electrostatic capacity change sensing apparatus 1 is applied to the level sensing apparatus, a level of the substance may be sensed or calculated using the count value of the clock ck1 or ck2.

If the electrostatic capacity change sensing apparatus 1 is applied to the temperature sensing apparatus, the temperature change may be sensed or calculated using the count value of the clock ck1 or ck2.

According to the above-described electrostatic capacity change sensing apparatus, a system that senses and measures the change in the electrostatic capacity may be implemented only using two comparators, one SR latch, and two clock units. Therefore, it is possible to significantly reduce the manufacturing cost of the electrostatic capacity change sensing apparatus. Further, since a sensing frequency is not used to sense the electrostatic capacity change, it is possible to exclude the influence by the noise.

A circuit for the charging/discharging controller 100 illustrated in FIG. 1 is illustrative only. Therefore, if a circuit controls the charging/discharging of the reference capacitor Cref and the capacitor Cx to be measured according to a method as described above, the circuit comes within the scope of the present invention. In other words, if a circuit charges the reference capacitor Cref to the upper limit voltage, discharges the reference capacitor Cref to the lower limit voltage at least one time using the capacitor to be measured when the charging is completed, and controls the reference capacitor Cref to start being charged when the discharging is completed, the circuit may come within the scope of the charging/discharging controller 100 of the present invention. Further, the charging/discharging controller 100 is implemented by one chip and the charging/discharging of the reference capacitor Cref and the capacitor Cx to be measured may be controlled using a program that executes a charging/discharging control algorithm described above.

Hereinafter, referring to FIG. 3, an electrostatic capacity change sensing apparatus according to another exemplary embodiment of the present invention will be described.

Figure 3:
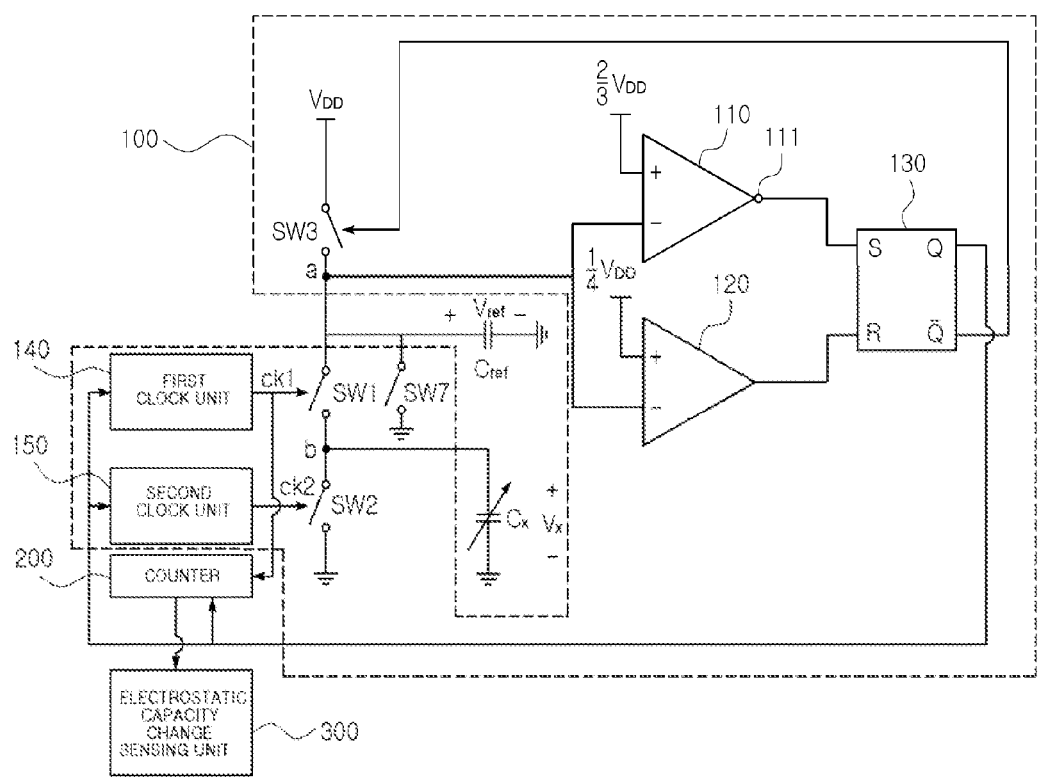
FIG. 3 is a circuit diagram illustrating a configuration of an electrostatic capacity change sensing apparatus according to another exemplary embodiment of the present invention.

FIG. 3 is a circuit diagram illustrating a configuration of an electrostatic capacity change sensing apparatus according to another exemplary embodiment of the present invention. In order to clarify the gist of the present invention, the repeated matters to the description in FIG. 1 will be omitted or briefly described.

Referring to FIG. 3, the counter 200 may receive a clock ck1 of the first clock unit 140 and count the received clock ck1 during charge sharing sections (a and b: see FIG. 2). Only during the charge sharing sections (a and b: see FIG. 2), a normal output Q of the SR latch 130 may output "1". Therefore, the counter 200 is enabled by Q=1 to count the clock ck1 of the first clock unit 140 during the charge sharing sections (a and b: see FIG. 2). Description for other components is as described with reference to FIG. 1. The electrostatic capacity change sensing unit 300 may sense the change in the electrostatic capacity using the count value for the clock ck1.

Hereinafter, referring to FIG. 4, an electrostatic capacity change sensing apparatus according to another exemplary embodiment of the present invention will be described.

Figure 4:
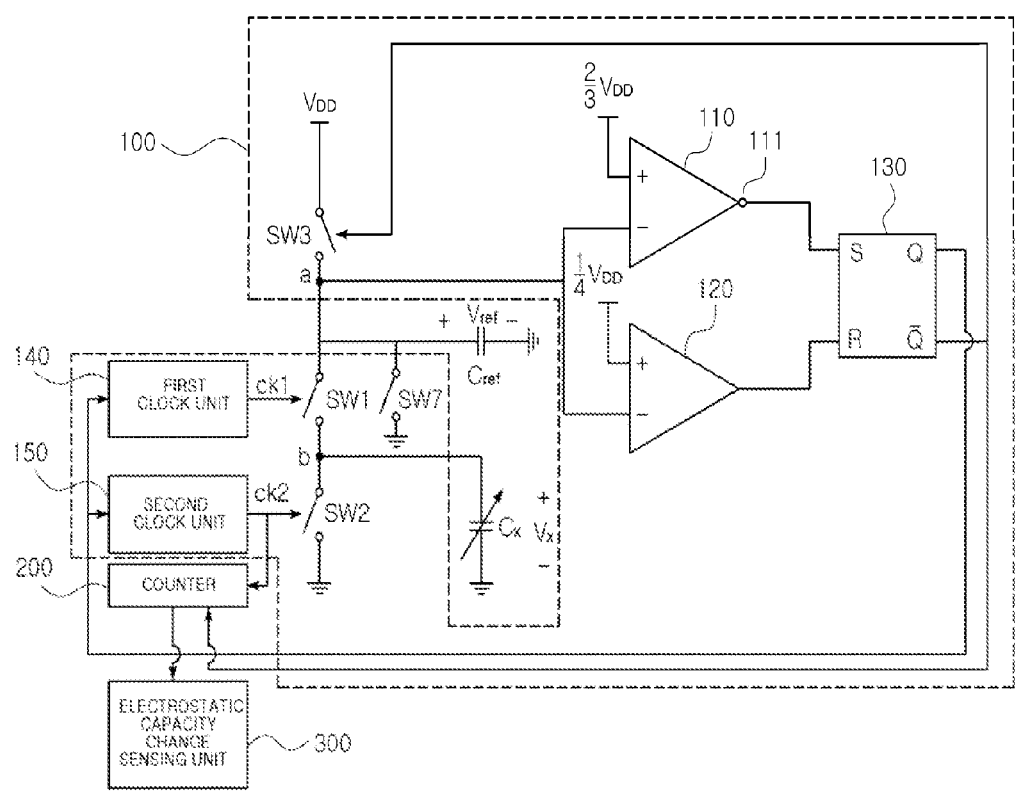
FIG. 4 is a circuit diagram illustrating a configuration of an electrostatic capacity change sensing apparatus according to another exemplary embodiment of the present invention.

FIG. 4 is a circuit diagram illustrating a configuration of an electrostatic capacity change sensing apparatus according to another exemplary embodiment of the present invention. In order to clarify the gist of the present invention, the repeated matters to the description in FIG. 1 will be omitted or briefly described.

Referring to FIG. 4, the counter 200 may receive a clock ck2 of the second clock unit 150 and count the received clock ck2 during charge sharing sections (a and b: see FIG. 2). Only during the charge sharing sections (a and b: see FIG. 2), a complementary output Q' of the SR latch 130 may output "0". Therefore, the counter 200 is enabled by Q=0 to count the clock ck2 of the second clock unit 150 during the charge sharing sections (a and b: see FIG. 2). Description for other components is as described with reference to FIG. 1. Differently from those illustrated in FIG. 4, the counter 200 may be designed to count the clock ck1 of the first clock unit 140 during a count enable section.

Hereinafter, referring to FIG. 5, an electrostatic capacity change sensing apparatus according to another exemplary embodiment of the present invention will be described.

Figure 5:
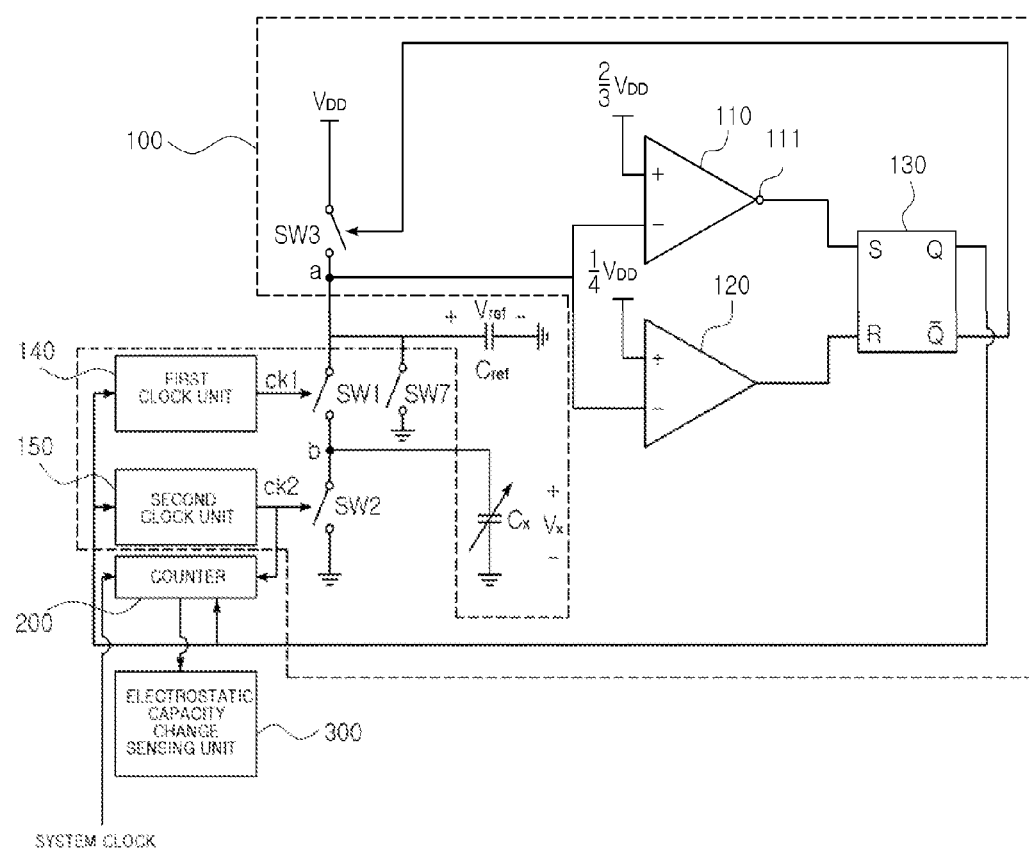
FIG. 5 is a circuit diagram illustrating a configuration of an electrostatic capacity change sensing apparatus according to another exemplary embodiment of the present invention.

FIG. 5 is a circuit diagram illustrating a configuration of an electrostatic capacity change sensing apparatus according to another exemplary embodiment of the present invention. In order to clarify the gist of the present invention, the repeated matters to the description in FIG. 1 will be omitted or briefly described.

Referring to FIG. 5, the counter 200 may receive a system clock and count the received system clock during the charge sharing sections (a and b: see FIG. 2). In this case, Q=1 is used as a count enable signal. Differently from those illustrated in FIG. 5, the counter 200 may be designed to be connected to the complementary output Q' of the SR latch 130 and use Q'=0 as a count enable signal. Since the system clock has a higher frequency than that of the clocks ck1 and ck2, a higher count value may be obtained during the charge sharing sections (a and b: see FIG. 2). Therefore, if the change in the electrostatic capacity is sensed using the system clock, a higher resolution may be provided.

Hereinafter, referring to FIG. 6, an electrostatic capacity change sensing apparatus according to another exemplary embodiment of the present invention will be described.

Figure 6:
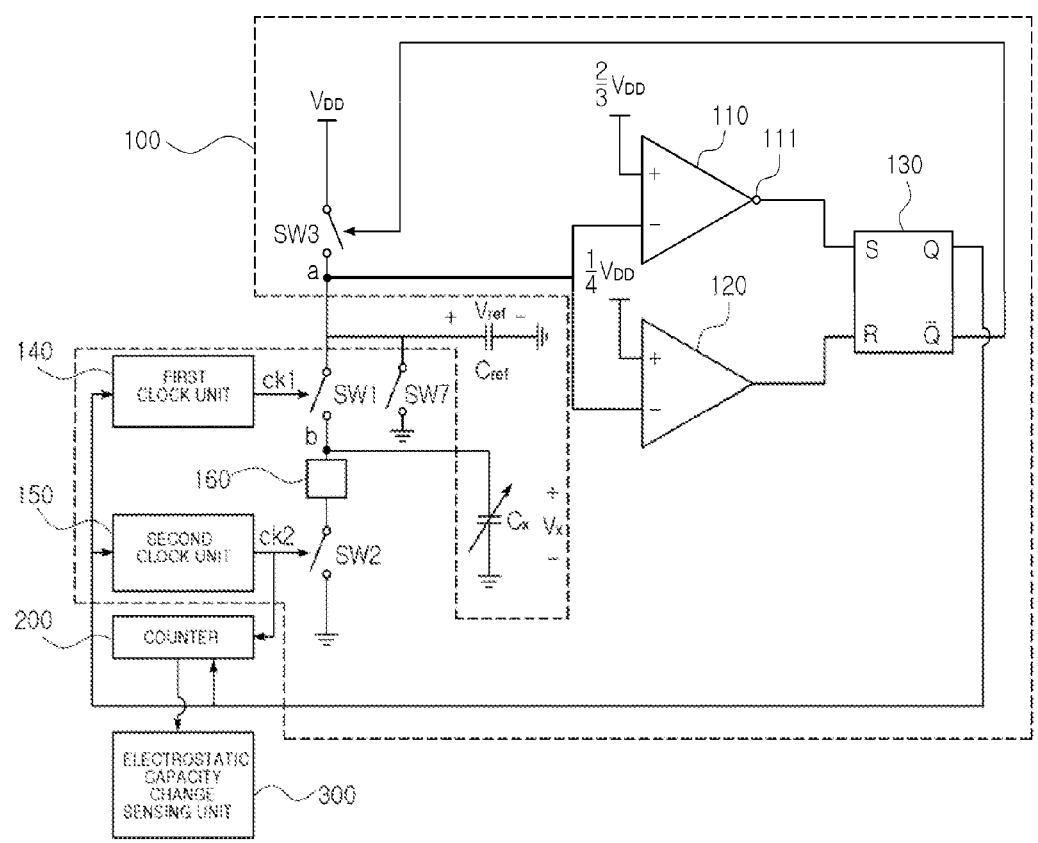
FIG. 6 is a circuit diagram illustrating a configuration of an electrostatic capacity change sensing apparatus according to another exemplary embodiment of the present invention.

FIG. 6 is a circuit diagram illustrating a configuration of an electrostatic capacity change sensing apparatus according to another exemplary embodiment of the present invention. In order to clarify the gist of the present invention, the repeated matters to the description in FIG. 1 will be omitted or briefly described.

Referring to FIG. 6, an electrostatic capacity change sensing apparatus 5 may include a passive impedance 160 on a discharging path of the capacitor Cx to be measured. The passive impedance 160 may include at least one of, for example, a resistor, an inductor, and a capacitor. The discharging of the capacitor Cx to be measured may be adjusted by the passive impedance 160. In other words, if a time constant formed by the capacitor Cx to be measured and the passive impedance 160 when the capacitor Cx to be measured is discharged is sufficiently large, not all charges on the capacitor Cx to be measured may be discharged during a discharging section (a section where the ck2 is high level). The charges on the reference capacitor Cref is may be more slowly discharged by the charges which remain in the capacitor Cx to be measured. Therefore, a length of the charge sharing period may be adjusted by the passive impedance 160.

If the charge sharing period is lengthened, the sufficient number of clocks ck2 of the second clock unit 150 may be counted by the passive impedance 160. By doing this, a higher resolution may be provided. The passive impedance 160 on the discharging path of the capacitor Cx to be measured as described above may also be applied to the electrostatic capacity change sensing apparatuses in FIGS. 3 to 5.

In FIGS. 1 to 6, the charging/discharging controller 100 may be implemented by a single chip. In this case, at least one of the power supply VDD, the first clock unit 140, the second clock unit 150, and the passive impedance 160 may be provided separately from the chip. The first comparator 110, the second comparator 120, and the SR latch 130 are provided on the single chip, the input terminals of the first comparator 110 and the second comparator 120 and the output terminal of the SR latch 130 are connected to a pin of the chip, and a switch is connected to the pin so that the electrostatic capacity change detecting system of the present invention may be implemented. Therefore, the electrostatic capacity change detecting system of the present invention may be easily implemented using a chip including the first comparator 110, the second comparator 120, and the SR latch 130.

Hereinafter, referring to FIG. 7, a structure and an operation of an electrostatic capacity change sensing apparatus according to another exemplary embodiment of the present invention will be described.

Figure 7:
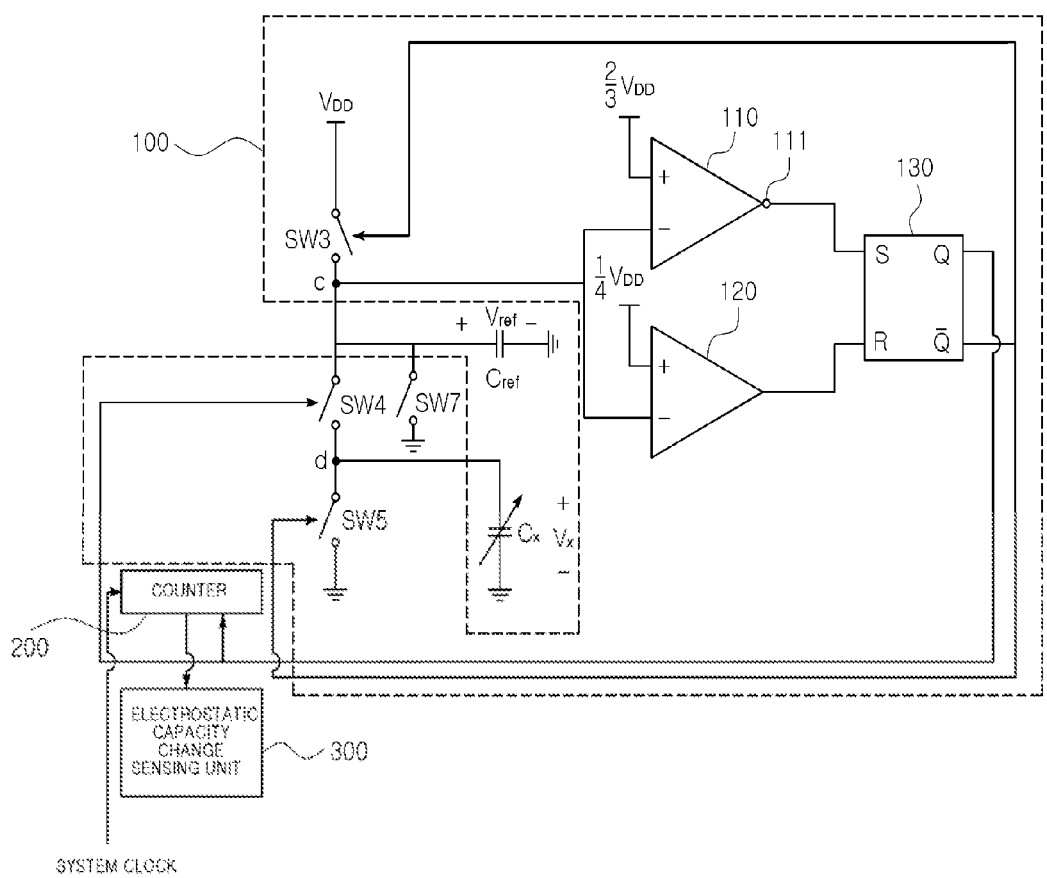
FIG. 7 is a circuit diagram illustrating a configuration of an electrostatic capacity change sensing apparatus according to another exemplary embodiment of the present invention.

FIG. 7 is a circuit diagram illustrating a configuration of an electrostatic capacity change sensing apparatus according to another exemplary embodiment of the present invention. In order to clarify the gist of the present invention, the repeated matters to the description in FIG. 1 will be omitted or briefly described.

Referring to FIG. 7, an electrostatic capacity change apparatus 6 according to another exemplary embodiment of the present invention may include the reference capacitor Cref, the capacitor Cx to be measured, the charging/discharging controller 100, the counter 200, and the electrostatic capacity change sensing unit 300.

n the electrostatic capacity change apparatus 6 of FIG. 7, the charging/discharging controller 100 and the counter 200 may be different from those of FIG. 1.

First, if the normal output Q of the SR latch 130 is "1", a fourth switch sw4 may be turned on. In other words, in a section where Q=1, the capacitor Cx to be measured may be charged.

If the complementary output Q' of the SR latch 130 is "1", a fifth switch sw5 may be turned on. In the section where Q'=1, the capacitor Cx to be measured is discharged to be reset.

The counter 200 may receive the system clock and count the received system clock in the section where Q=1. In other words, the counter 200 is enabled when Q=1. Differently from this, the counter 200 may be designed to use Q'=0 as a count enable signal.

The electrostatic capacity change sensing unit 300 may sense the change in the electrostatic capacity using a count value of the system clock which is counted by the counter 200 in the count enable section.

Hereinafter, referring to FIGS. 7 and 8, a specific operation of the electrostatic capacity change sensing apparatus 6 in accordance with the status in the electrostatic capacity change apparatus 6 of FIG. 7 will be described.

Figure 8:
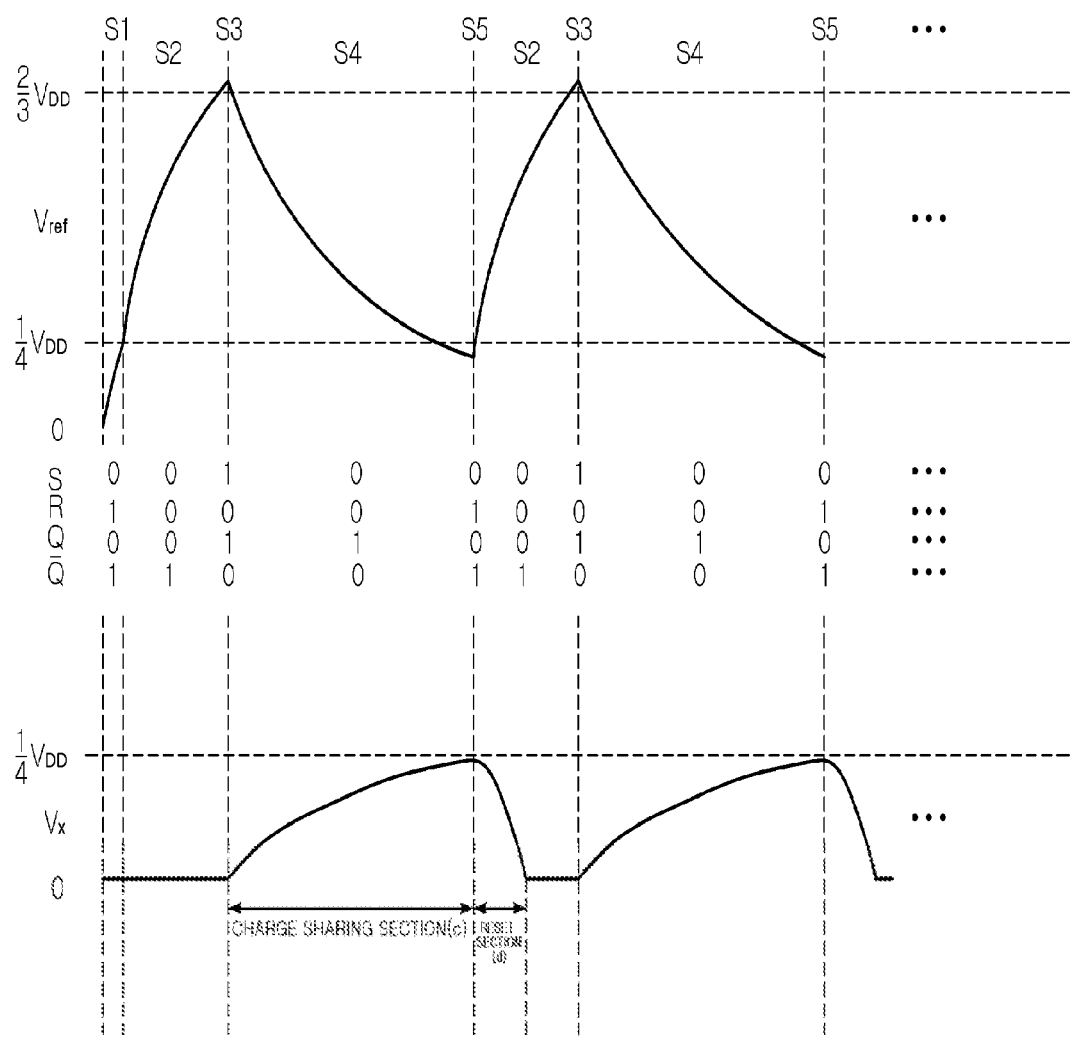
FIG. 8 is a timing chart illustrating an operation of the electrostatic capacity change apparatus of FIG. 7.

FIG. 8 is a timing chart illustrating an operation of the electrostatic capacity change apparatus of FIG. 7. For the convenience of the description, the status of the electrostatic capacity change sensing apparatus 6 will be described. By the following description, the structure and the operation of the electrostatic capacity change apparatus 6 of FIG. 7 will be clearer.

First Status S1

First, it is assumed that the reference capacitor Cref is reset prior to the first status S1. Since a voltage Vref of the reset reference capacitor Cref is "0", the first comparator 110 may output a high level 1. The set input terminal S of the SR latch 130 may receive "0" via the inverter 111. Further, since the voltage Vref of the reference capacitor Cref is "0", the second comparator 110 may output a high level 1. By doing this, the reset input terminal R of the SR latch 130 may receive "1". By doing this, the output of the SR latch 130 may be Q=0 and Q'=1. In the first status S1 when the voltage Vref of the reference capacitor Cref is "0" and the lower limit voltage 1/4 VDD, the output of the SR latch 130 may be maintained at Q=0 and Q'=1. Since Q'=1, the third switch sw3 may be turned on.

Therefore, the reference capacitor Cref may be charged to the lower limit voltage 1/4VDD by the voltage source VDD in the first status S1. In this case, since Q=0, the fourth switch sw1 may be turned off. Since Q'=1, the fifth switch sw5 may be turned on.

Second Status S2

In the second status S2, the voltage Vref in the reference capacitor Cref may be positioned between the lower limit voltage 1/4VDD and the upper limit voltage 2/3VDD. Therefore, the first comparator 110 outputs "1" so that the set input terminal S of the SR latch 130 may receive "0". Further, the second comparator 120 outputs "0" so that the reset input terminal R of the SR latch 130 may receive "0". In accordance with the operation principle of the SR latch 130 which is described above, the SR latch 130 may maintain Q=0 and Q'=1 in the first status.

Therefore, the reference capacitor Cref may be charged to the upper limit voltage 2/3VDD by the voltage source VDD in the second status S2. In this case, since Q=0, the fourth switch sw1 may be turned off. Since Q'=1, the fifth switch sw5 may be turned on.

Third Status S3

In the third status S3, the voltage Vref in the reference capacitor Cref may be higher than the upper limit voltage 2/3VDD. Therefore, the first comparator 110 outputs "0" so that the set input terminal S of the SR latch 130 may receive "1". Further, the second comparator 120 outputs "0" so that the reset input terminal R of the SR latch 130 may receive "0".

Therefore, the SR latch 130 may output Q=1 and Q'=0.

As soon as the voltage Vref in the reference capacitor Cref exceeds the upper limit voltage 2/3VDD, Q'=0, and thus the third switch sw3 is turned off. Therefore, the reference capacitor Cref may be charged to a value which is very approximate to the upper limit voltage 2/3VDD.

Since Q'=0, the fifth switch sw5 may be turned off. Since Q'=1, the fourth switch sw4 may be turned on. Further, since Q=1, the counter 200 is enabled. The fourth switch sw4 is turned on, so that the charge on the reference capacitor Cref starts being shared with the capacitor Cx to be measured. In this case, since the third switch sw3 is turned off, the charge which is supplied to the reference capacitor Cref may be blocked.

Fourth Status S4

The voltage Vref on the reference capacitor Cref may be positioned between the upper limit voltage 2/3VDD and the lower limit voltage 1/4VDD. Therefore, the set input terminal S of the SR latch 130 may receive "0" and the reset input terminal R of the SR latch 130 may receive "0". Accordingly, in the fourth status S4, the SR latch 130 may maintain a status of Q=1 and Q'=0.

Therefore, the charge of the reference capacitor Cref may be continuously shared with the capacitor Cx to be measured during the whole fourth status S4. In other words, during the fourth status S4, the reference capacitor Cref may be continuously discharged and the capacitor Cx to be measured may be continuously charged.

Fifth Status S5

As the charge on the reference capacitor Cref is continuously shared with the capacitor Cx to be measured and the charge on the capacitor Cx to be measured is continuously discharged, the voltage Vref on the reference capacitor Cref may become lower than the lower limit voltage 1/4VDD. By doing this, the set input terminal S of the SR latch 130 may receive "0". Further, the reset input terminal R of the SR latch 130 may receive "1". By doing this, the output of the SR latch 130 may be Q=0 and Q'=1.

Since Q=0, the fourth switch sw4 may be turned off. Therefore, the discharging in the reference capacitor Cref may be stopped. In other words, the sharing of the charge on the reference capacitor Cref with the capacitor Cx to be measured may be stopped. Since Q'=1, the fifth switch sw5 may be turned on. Therefore, all charges which are charged in the capacitor Cx to be measured are discharged to reset the capacitor Cx to be measured. Since Q'=1, the third switch sw3 may be turned on. By doing this, the reference capacitor Cref starts being charged. Further, since Q=0, the counter 300 is disabled.

With the above principles, the status change of the electrostatic capacity repeats S2 to S5. In other words, the voltage Vref on the reference capacitor Cref is repeatedly charged and discharged between the upper limit voltage 2/3VDD and the lower limit voltage 1/4VDD.

In this case, since Q=1 in the third status, the counter 200 is enabled and may count the system clock during the fourth status S4. In other words, since Q=1 only during a charge sharing section c, the counter 200 is enabled by Q=1 to count the system clock during the charge sharing section c. Further, corresponding to the transition from Q=1 to Q=0 in the fifth status, the counter 200 may transmit the count value during the charge sharing section c to the electrostatic capacity change sensing unit 300.

As known in the art, if the electrostatic capacity of the capacitor Cx to be measured is changed, the length of the charge sharing section c may also be changed. Accordingly, the electrostatic capacity change sensing unit 300 may sense the change in the electrostatic capacity using the system clock counted during the charge sharing section c. Further, the electrostatic capacity change sensing unit 300 may calculate the electrostatic capacity using the system clock counted during the charge sharing section c.

Hereinafter, referring to FIG. 9, an electrostatic capacity change sensing apparatus according to another exemplary embodiment of the present invention will be described.

Figure 9:
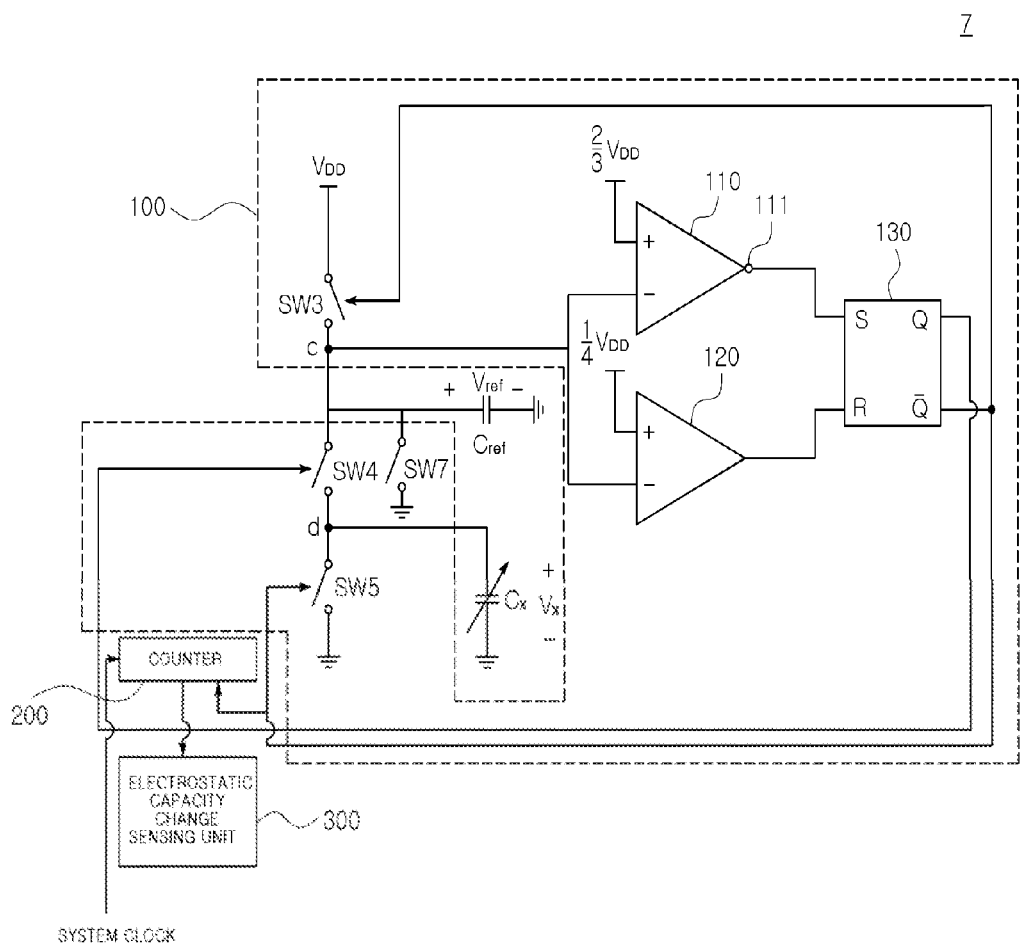
FIG. 9 is a circuit diagram illustrating a configuration of an electrostatic capacity change sensing apparatus according to another exemplary embodiment of the present invention.

FIG. 9 is a circuit diagram illustrating a configuration of an electrostatic capacity change sensing apparatus according to another exemplary embodiment of the present invention. In order to clarify the gist of the present invention, the repeated matters to the description in FIG. 7 will be omitted or briefly described.

Referring to FIG. 9, the counter 200 is enabled by the complementary output Q' of the SR latch 130. The complementary output terminal Q' may be "0" only during the charge sharing section. Therefore, the counter 200 is designed to be enabled by Q'=0 to count the system clock during the charge sharing.

Hereinafter, referring to FIG. 10, an electrostatic capacity change sensing apparatus according to another exemplary embodiment of the present invention will be described.

Figure 10:
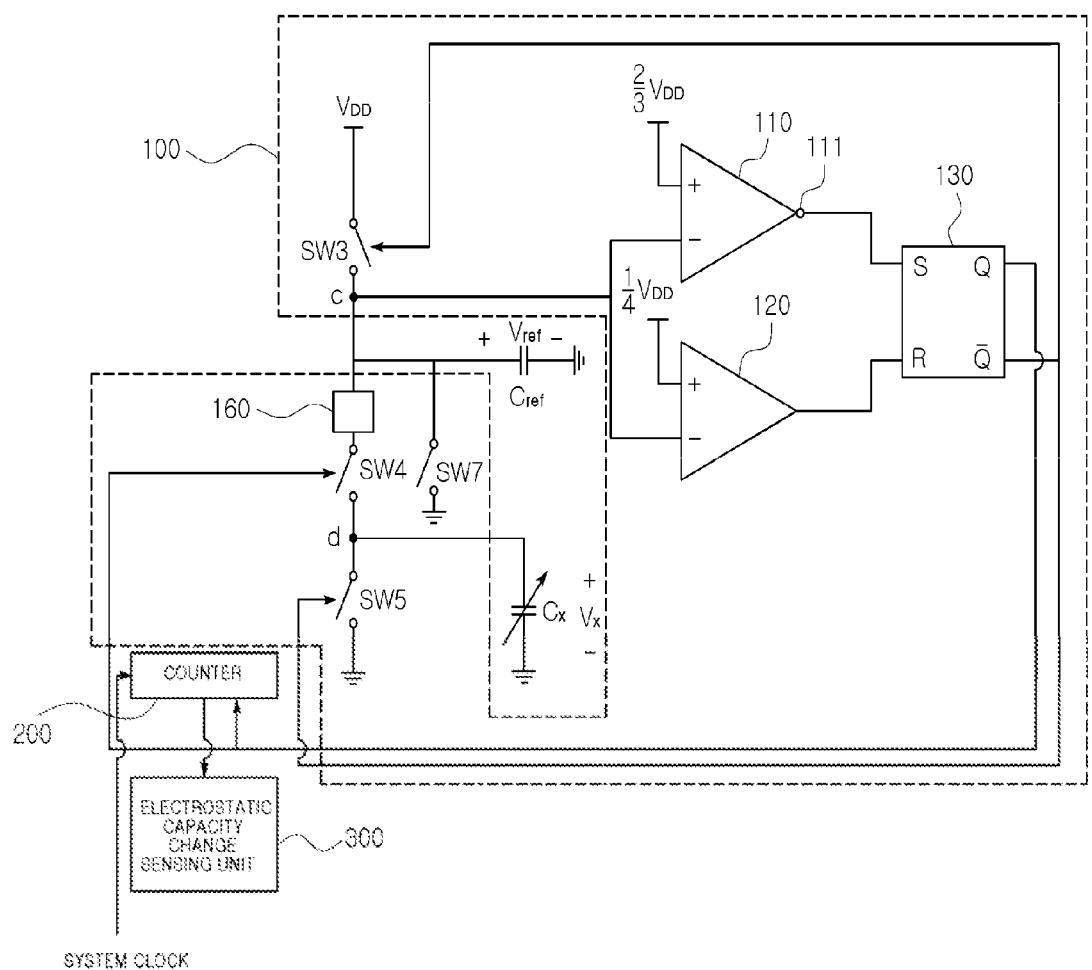
FIG. 10 is a circuit diagram illustrating a configuration of an electrostatic capacity change sensing apparatus according to another exemplary embodiment of the present invention.

FIG. 10 is a circuit diagram illustrating a configuration of an electrostatic capacity change sensing apparatus according to another exemplary embodiment of the present invention. In order to clarify the gist of the present invention, the repeated matters to the description in FIG. 7 will be omitted.

Referring to FIG. 10, an electrostatic capacity change sensing apparatus 8 may include a passive impedance 160 on a charge sharing path disposed between the reference capacitor Cref and the capacitor Cx to be measured. The passive impedance 160 may include at least one of, for example, a resistor, an inductor, and a capacitor. The length of the charge sharing section C may be adjusted by the passive impedance 160. For example, a resistor is added by the passive impedance 160 to sufficiently increase a time constant at the time of sharing, thereby lengthening the charge sharing period c. If the charge sharing period c is lengthened, the sufficient number of system clocks may be counted during the charge sharing period C. Therefore, a sufficient resolution may be obtained at the time of sensing or measuring the electrostatic capacity change. Further, in order to easily drop the voltage of the reference capacitor Cref to be equal to or lower than the lower limit voltage 1/4VDD, the electrostatic capacity of the reference capacitor Cref is preferably larger than an expected electrostatic capacity of the capacitor Cx to be measured. Therefore, the capacitor Cx to be measure may have a smaller electrostatic capacity. Accordingly, if the capacitor Cx to be measured is applied to the touch sensing apparatus, the touch pad may be manufactured to have a very small size. Therefore, the capacitor Cx to be measured and the electrostatic capacity change detecting apparatus may be installed on a single chip.

As illustrated in FIG. 9 above, in the electrostatic capacity change sensing apparatus 8 in FIG. 10, the counter 200 may be designed to be enabled by the complementary output Q'=0 of the SR latch 130. Further, the passive impedance 160 may be provided to be parallel to the charge sharing path and an additional switch may be provided in a line which is parallel to the charge sharing path. In this case, the additional switch may be controlled to be turned on/off at the same timing as the fourth switch sw4.

In FIGS. 7, 9, and 10, the charging/discharging controller 100 may be implemented by a single chip. In this case, at least one of the power supply VDD and the passive impedance 160 may be provided separately from the chip. The first comparator 110, the second comparator 120, and the SR latch 130 are provided on the single chip, the input terminals of the first comparator 110 and the second comparator 120 and the output terminal of the SR latch 130 are connected to a pin of the chip, and the pin is connected to a switch so that the electrostatic capacity change detecting system of the present invention may be implemented. Therefore, the electrostatic capacity change detecting system of the present invention may be easily implemented using a chip including the first comparator 110, the second comparator 120, and the SR latch 130.

According to the electrostatic change sensing apparatus of FIGS. 7 to 10 as described above, a system that senses the change in the electrostatic capacity may be completely implemented only by two comparators and one SR latch. Therefore, it is possible to significantly reduce the manufacturing cost of the electrostatic capacity change sensing apparatus. Further, as described above, since a sensing frequency is not used to sense the electrostatic capacity change, it is possible to exclude the influence by the noise. Further, the change in the electrostatic capacity may be measured only by one time charge sharing process. In order to control the charge sharing process, in the electrostatic capacity change sensing apparatus that uses two clocks ck1 and ck2, the clock may be fluctuated by the external noise. Therefore, a precise count value may not be provided. However, the electrostatic capacity change sensing apparatuses of FIGS. 7 to 10 sense the change in the electrostatic capacity only by one time charge sharing process and counting the system clock, and thus the influence by the external noise may be excluded at most. Therefore, it is possible to precisely sense the change in the electrostatic capacity.

Hereinafter, referring to FIGS. 1 to 4, 6, and 11, an electrostatic capacity change sensing apparatus according to an exemplary embodiment of the present invention will be described.

Figure 11:
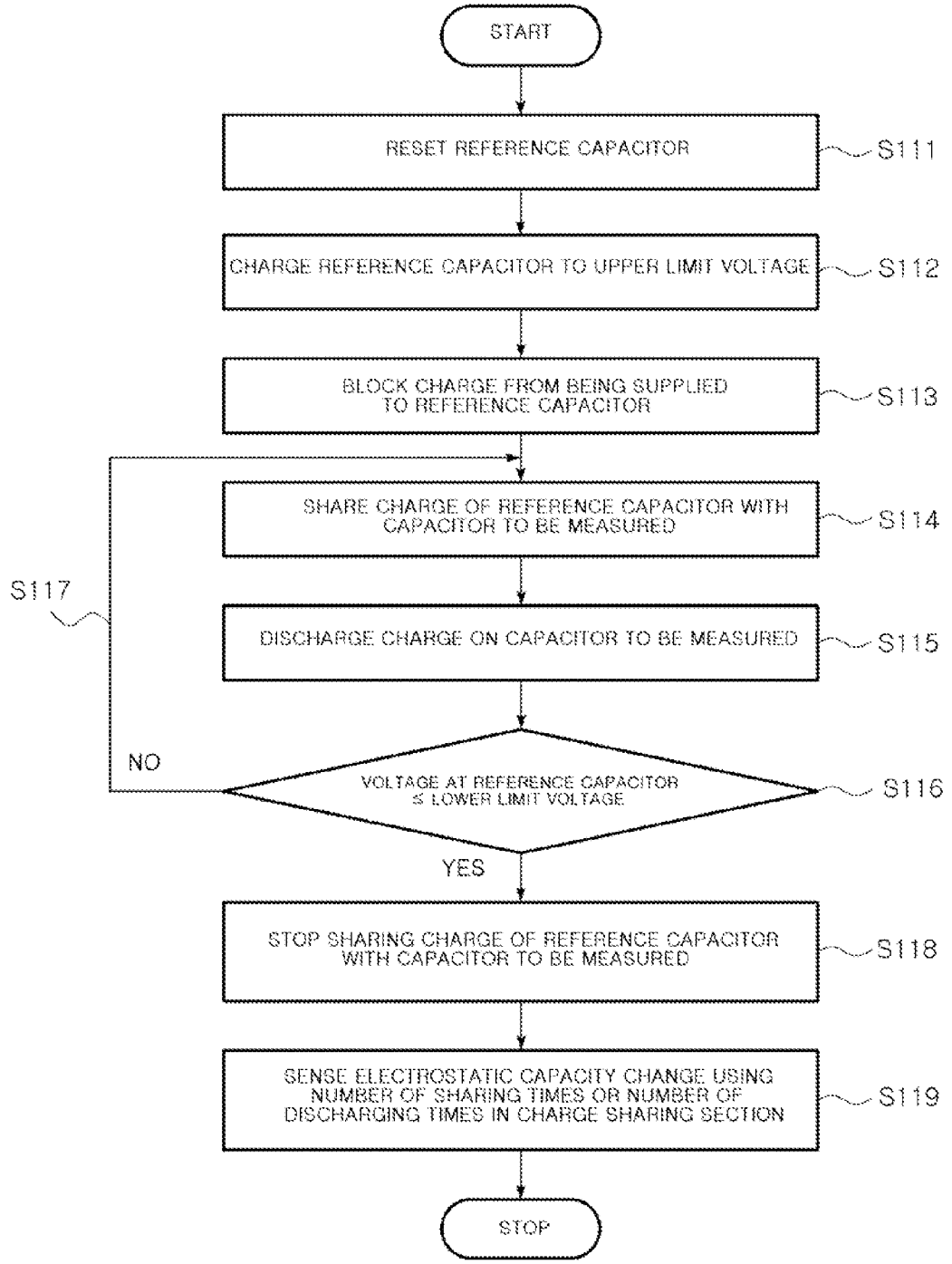
FIG. 11 is a flowchart of a process that performs an electrostatic capacity change sensing method according to an exemplary embodiment of the present invention.

FIG. 11 is a flowchart of a process that performs an electrostatic capacity change sensing method according to an exemplary embodiment of the present invention. The repeated matters to the above description will be omitted or briefly described.

First, referring to FIG. 11, when a power supply is applied to the electrostatic capacity change sensing apparatus, the reference capacitor Cref may be reset to initialize the electrostatic capacity change sensing apparatus (S111). In this case, the first switch sw1 may be turned off, the second switch sw2 may be turned off, the third switch sw3 may be turned off, and the seventh switch sw7 may be turned on. Specific matters of the resetting of the reference capacitor Cref are as described with reference to FIGS. 1 to 4, and 6.

Next, the reference capacitor Cref may be charged to the upper limit voltage 2/3VDD (S112). In this case, the first switch sw1 may be turned off, the second switch sw2 may be turned off, and the third switch sw3 may be turned on. Specific matters of the charging of the reference capacitor Cref are as described with reference to FIGS. 1 to 4, and 6.

Next, the supplying of the charge to the reference capacitor Cref may be blocked (S113). In this case, the first switch sw1 may be turned off, the second switch sw2 may be turned off, and the third switch sw3 may be turned off. Specific matters of the blocking of the supplying of the charge to the reference capacitor Cref are as described with reference to FIGS. 1 to 4, and 6.

Next, the reference capacitor Cref may share the charge with the capacitor Cx to be measured (S114). In this case, the first switch sw1 may be turned on, the second switch sw2 may be turned off, and the third switch sw3 may be turned off. The specific matters of the sharing of the charge are as described with reference to FIGS. 1 to 4. S112 and S113 may be performed simultaneously or nonsimultaneously. Alternatively, S113 may be performed prior to S112.

Next, the charge of the capacitor Cx to be measured may be discharged (S115). In this case, the first switch sw1 may be turned off, the second switch sw2 may be turned on, and the third switch sw3 may be turned off. Specific matters of the discharging of the charge of the capacitor Cx to be measured are as described with reference to FIGS. 1 to 4, and 6.

Next, it may be determined whether the voltage Vref at the reference capacitor Cref is equal to or lower than the lower limit voltage 1/4VDD (S116). The determining process may be performed by the comparators 110 and 120. The determination result by the comparators 110 and 120 may generate a control signal of the first to third switches sw1, sw2, and sw3 through the outputs Q and Q' of the SR latch 130.

As the determination result, if the voltage Vref at the reference capacitor Cref is not equal to or lower than the lower limit voltage 1/4VDD, S113 and S114 are repeatedly performed (S117). In other words, the electrostatic capacity change sensing apparatus may repeat the charge sharing process until the voltage Vref at the reference capacitor Cref is equal to or lower than the lower limit voltage 1/4VDD.

To the contrary, as the determination result, if the voltage Vref at the reference capacitor Cref is equal to or lower than the lower limit voltage 1/4VDD, the charge sharing between the reference capacitor Cref and the capacitor Cx to be measured may be stopped (S118). In this case, the first switch sw1 may be turned off, the second switch sw2 may be turned off, and the third switch sw3 may be turned off (or on). Specific matters of the stopping of the charge sharing are as described with reference to FIGS. 1 to 4, and 6.

Next, the electrostatic capacity change sensing unit 300 may sense the change in the electrostatic capacity at the capacitor Cx to be measured using the number of sharing times or the number of discharging times in the charge sharing section (S113 and S114) (S119).

S112 to S118 may be repeatedly performed one or plural times.

The above-described electrostatic capacity change sensing method may be applied to an apparatus that recognizes the change in the electrostatic capacity to convert the change into significant information, for example, a touch sensing apparatus, a level sensing apparatus, or a temperature sensing apparatus. In this case, in order to sense the electrostatic capacity change in real time, S111 to S118 may be repeatedly performed in real time. In this case, the sensing may also be performed in a predetermined time interval.

Hereinafter, referring to FIGS. 5, 6, and 12, an electrostatic capacity change sensing apparatus according to another exemplary embodiment of the present invention will be described. The repeated matters to the above description will be omitted or briefly described.

Figure 12:
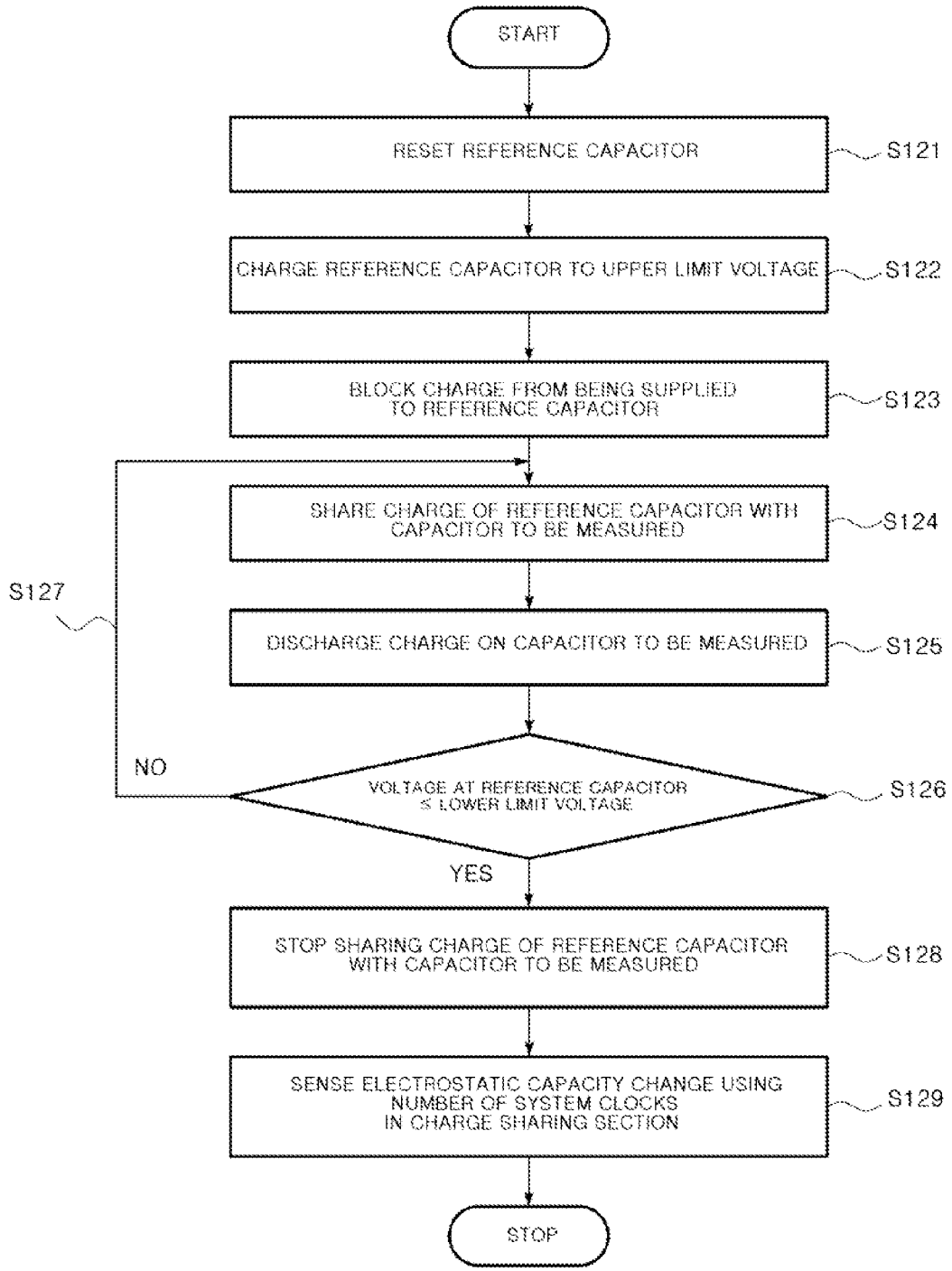
FIG. 12 is a flowchart of a process that performs an electrostatic capacity change sensing method according to another exemplary embodiment of the present invention.

FIG. 12 is a flowchart of a process that performs an electrostatic capacity change sensing method according to another exemplary embodiment of the present invention.

In FIGS. 12, S121 to S128 correspond to S111 to S118 of FIG. 11. Therefore, specific description thoseof will be omitted.

However, in S129, the electrostatic capacity change sensing unit 300 may sense the change in the electrostatic capacity at the capacitor Cx to be measured using the number of system clocks in the charge sharing section (S129).

S122 to S129 may be repeatedly performed one or plural times.

The above-described electrostatic capacity change sensing method may be applied to an apparatus that recognizes the change in the electrostatic capacity to convert the change into significant information, for example, a touch sensing apparatus, a level sensing apparatus, or a temperature sensing apparatus. In this case, in order to sense the electrostatic capacity change in real time, S121 to S128 may be repeatedly performed in real time. In this case, the sensing may be performed in a predetermined time interval.

Hereinafter, referring to FIGS. 7 to 10, and 13, an electrostatic capacity change sensing apparatus according to another exemplary embodiment of the present invention will be described. The repeated matters to the above description will be omitted or briefly described.

Figure 13:
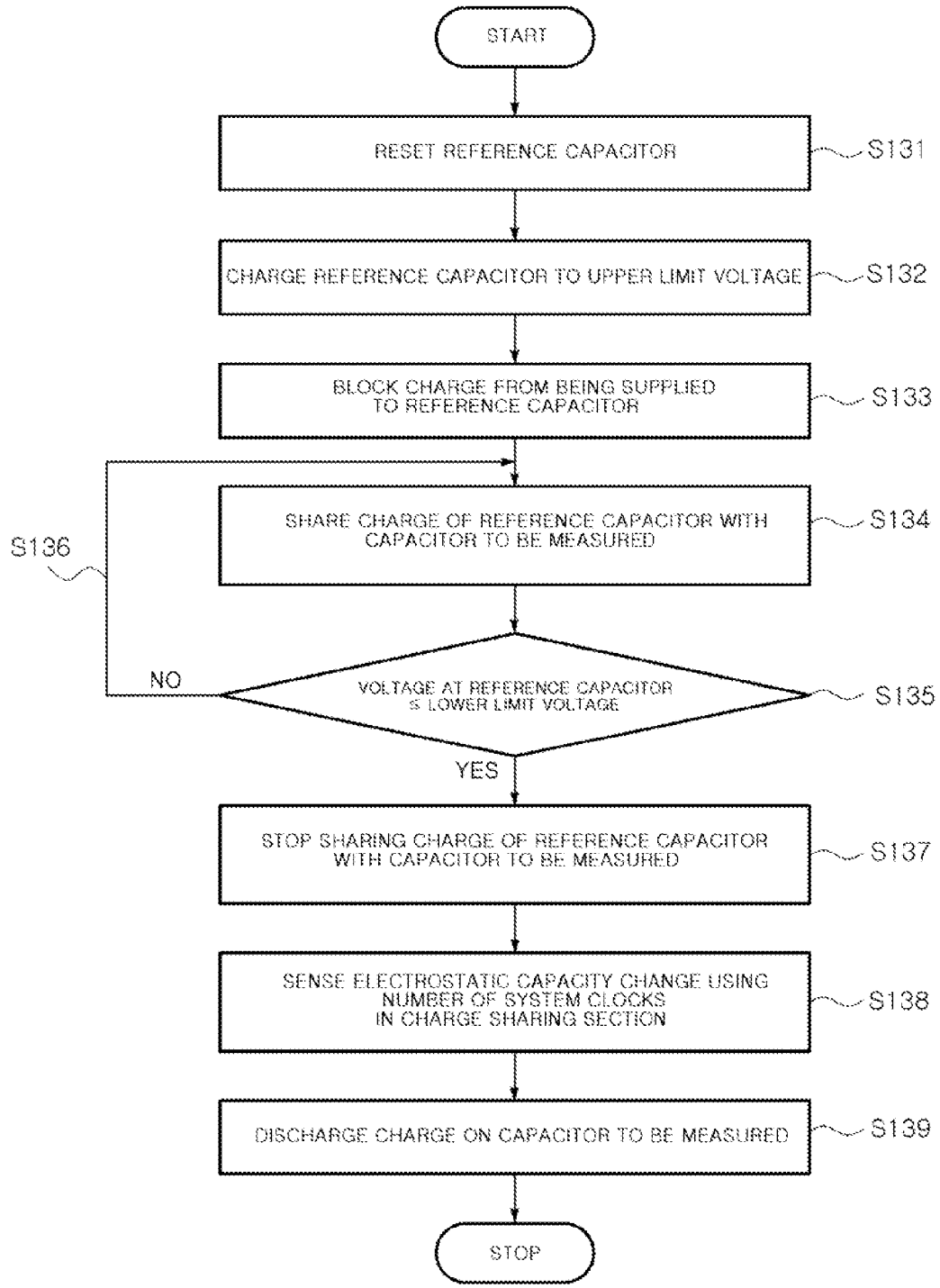
FIG. 13 is a flowchart of a process that performs an electrostatic capacity change sensing method according to another exemplary embodiment of the present invention.

FIG. 13 is a flowchart of a process that performs an electrostatic capacity change sensing method according to another exemplary embodiment of the present invention.

First, referring to FIG. 13, when a power supply is applied to the electrostatic capacity change sensing apparatus, the reference capacitor Cref may be reset to initialize the electrostatic capacity change sensing apparatus (S131). In this case, the third switch sw3 may be turned off, the fourth switch sw4 may be turned off, the fifth switch sw5 may be turned off, and the seventh switch sw7 may be turned on. Specific matters of the resetting of the reference capacitor Cref are as described with reference to FIGS. 7 to 10.

Next, the reference capacitor Cref may be charged to the upper limit voltage 2/3VDD (S132). In this case, the third switch sw3 may be turned on, the fourth switch sw4 may be turned off, and the fifth switch sw5 may be turned on. Specific matters of the charging of the reference capacitor Cref are as described with reference to FIGS. 7 to 10.

Next, the supplying of the charge to the reference capacitor Cref may be blocked (S133). In this case, the third switch sw3 may be turned off, the fourth switch sw4 may be turned on, and the fifth switch sw5 may be turned off. Specific matters of the blocking of the charge supplying to the reference capacitor Cref are as described with reference to FIGS. 7 to 10.

Next, the reference capacitor Cref may share the charge with the capacitor Cx to be measured (S134). In this case, the third switch sw3 may be turned off, the fourth switch sw4 may be turned on, and the fifth switch sw5 may be turned off. The specific matters of the sharing of the charge are as described with reference to FIGS. 7 to 10. S132 and S133 may be performed simultaneously or nonsimultaneously. Alternatively, S133 may be performed prior to S132.

Next, it may be determined whether the voltage Vref at the reference capacitor Cref is equal to or lower than the lower limit voltage 1/4VDD (S135). The determining process may be performed by the comparators 110 and 120. The determination result by the comparators 110 and 120 may generate a control signal of the third to fifth switches sw3, sw4, and sw5 through the outputs Q and Q' of the SR latch 130.

As the determination result, if the voltage Vref at the reference capacitor Cref is not equal to or lower than the lower limit voltage 1/4VDD, the charge may be continuously shared (S133) (S136). That is, a state when the third switch sw3 is turned off, the fourth switch sw4 is turned on, and the fifth switch sw5 is turned off may be continued until the voltage Vref at the reference capacitor Cref becomes the lower limit voltage 1/4VDD.

To the contrary, as the determination result, if the voltage Vref at the reference capacitor Cref is equal to or lower than the lower limit voltage 1/4VDD, the charge sharing between the reference capacitor Cref and the capacitor Cx to be measured may be stopped (S137). In this case, the third switch sw3 may be turned on, the fourth switch sw4 may be turned off, and the fifth switch sw5 may be turned on. The specific matters of the stopping of the charge sharing are as described with reference to FIGS. 7 to 10.

Next, the electrostatic capacity change sensing unit 300 may sense the change in the electrostatic capacity using the number of the system clocks in the charge sharing section (S134) (S138).

Next, the charge of the capacitor Cx to be measured may be discharged (S139). In this case, the third switch sw3 may be turned on, the fourth switch sw4 may be turned off, and the fifth switch sw5 may be turned on. S136 to S138 may be performed simultaneously or nonsimultaneously. Further, the order of S136 to 138 may be changed.

S132 to S139 may be repeatedly performed one or plural times.

The above-described electrostatic capacity change sensing method may be applied to an apparatus that recognizes the change in the electrostatic capacity to convert the change into significant information, for example, a touch sensing apparatus, a level sensing apparatus, or a temperature sensing apparatus. In this case, in order to sense the electrostatic capacity change in real time, S132 to S139 may be repeatedly performed in real time. In this case, the sensing may be performed in a predetermined time interval.

The above-described electrostatic capacity change sensing method may be performed by providing the comparison result of the voltage on the reference capacitor Cref with the upper limit voltage or the lower limit voltage as a digital signal (logic value, 1 bit) through the comparators 110 and 120 and logically operating the digital signal in the SR latch 130. The switches sw1, sw2, sw3, sw4, and sw5 may be controlled using the result of the logical operation. By controlling the switches sw1, sw2, sw3, sw4, and sw5, the charging/discharging of the reference capacitor Cref and the capacitor Cx to be measured may be controlled. Further, the counter 200 is enabled or disabled by the output of the SR latch 130. By the output of the SR latch 130, the transmission of the count value in the counter 200 to the electrostatic capacity change sensing unit 300 may be synchronized. By using the above structure and method, a separate program that controls the charging/discharging of the reference capacitor Cref and the capacitor Cx to be measured is not required. Therefore, a memory that stores the program and a separate processor that executes the program stored in the memory are not required.

However, the charging/discharging controller 100 as described above may be implemented on a single chip, which is different from those illustrated in the drawing and the switch may be controlled by a program that manipulates the pin on the chip. Accordingly, by a single chip and a program which is provided in the chip, the charging/discharging control operation or the electrostatic capacity change sensing method may be performed.

In the meantime, the electrostatic capacity change sensing method and the touch sensing method according to the present invention may be implemented by a program to be stored in a computer readable recording medium (a CD-ROM, an RAM, an ROM, a floppy disk, a hard disk, or an optical magnetic disk).

While the preferred exemplary embodiments of the present invention have been described for illustrative purposes, it should be understood by those skilled in the art that various changes, modifications, and additions may be made without departing from the spirit and scope of the present invention as defined in the appended claims.

The invention claimed is:

1. A method of sensing a change in an electrostatic capacity in a capacitor to be measured, the method comprising:
    a step of charging a reference capacitor by applying a power supply to the reference capacitor, in a status when the discharging of the reference capacitor is blocked;
    a step of stopping charging of the reference capacitor when a voltage on the reference capacitor exceeds an upper limit voltage, which is lower than the power supply;
    a step of sharing a part of charges of the reference capacitor with the capacitor to be measured;
    a step of discharging at least a part of the charges shared with the capacitor to be measured;
    a step of repeating at least one of the step of sharing a part of charges of the reference capacitor with the capacitor to be measured and the step of discharging at least a part of the charges shared with the capacitor to be measured until the voltage on the reference capacitor becomes lower than a lower limit voltage;
    a step of stopping the sharing and the discharging when the voltage on the reference capacitor is lower than the lower limit voltage; and
    a step of sensing the change in the electrostatic capacity in the capacitor to be measured using at least one of the number of sharing times and the number of discharging times,
    wherein the step of charging the reference capacitor by applying a power supply to the reference capacitor includes:
    a step of comparing the voltage on the reference capacitor with the upper limit voltage and the lower limit voltage;
    a step of inverting a comparison result with the upper limit voltage;
    a step of logically operating the lower limit voltage and the inverted comparison result with the upper limit voltage; and
    a step of maintaining the charging of the reference capacitor and the blocking the reference capacitor from being discharged, when the voltage on the reference capacitor is between the upper limit voltage and the lower limit voltage, based on the logical operation result.

2. The method of claim 1, wherein the step of charging the reference capacitor by applying a power supply to the reference capacitor to the step of stopping the sharing and the discharging when the voltage on the reference capacitor is lower than the lower limit voltage are controlled by the logical operation on the comparison result of the voltage on the reference capacitor with the upper limit voltage and the comparison result of the voltage on the reference capacitor with the lower limit voltage.

3. The method of claim 2, wherein the logical operation is performed by an SR latch.

4. The method of claim 1, further comprising:
    a step of stopping the charging of the reference capacitor and starting sharing the charge between the capacitor to be measured and the reference capacitor and discharging the shared charge, when the voltage on the reference capacitor exceeds the upper limit voltage, based on the logical operation result.

5. The method of claim 1, wherein the shared charge is discharged in a status when the charge is blocked from being shared.

6. The method of claim 1, wherein the discharging of the shared charge is delayed by a passive impedance which is provided on a discharging path of the shared charge.

7. The method of claim 1, wherein the step of sharing a part of charges of the reference capacitor with the capacitor to be measured and the step of discharging at least a part of the charges shared with the capacitor to be measured include:
  a step of comparing the voltage on the reference capacitor with the upper limit voltage and the lower limit voltage;
  a step of inverting a comparison result with the upper limit voltage;
  a step of logically operating the lower limit voltage and the inverted comparison result with the upper limit voltage; and
  a step of maintaining the sharing of the charge between the capacitor to be measured and the reference capacitor and the discharging of the shared charge and maintaining the blocking of the charge from being supplied to the reference capacitor, when the voltage on the reference capacitor is between the upper limit voltage and the lower limit voltage, based on the logical operation result.

8. The method of claim 7, wherein when the voltage on the reference capacitor is lower than the lower limit voltage, based on the logical operation result, the charge sharing between the capacitor to be measured and the reference capacitor and the discharging of the shared charge are stopped and the charging of the reference capacitor starts in a status when the discharging of the reference capacitor is blocked.

9. The method of claim 1, further comprising:
  a step of counting at least one of the number of sharing times and the number of discharging times;
  wherein the step of counting at least one of the number of sharing times and the number of discharging times starts by a signal that stops the charging of the reference capacitor.

10. The method of claim 1, further comprising:
  a step of counting at least one of the number of sharing times and the number of discharging times;
  wherein the step of counting at least one of the number of sharing times and the number of discharging times starts by a signal that allows the charge to be shared and discharges the shared charge.

11. The method of claim 1, further comprising:
  before the step of charging the reference capacitor by applying a power supply to the reference capacitor,
  a step of resetting the reference capacitor.

12. An apparatus of sensing a change in an electrostatic capacity in a capacitor to be measured, the apparatus comprising:
  a capacitor to be measured;
  a reference capacitor;
  a charging/discharging controller that applies a power supply to the reference capacitor to charge the reference capacitor in a status when the discharging of the reference capacitor is blocked, stops charging of the reference capacitor when a voltage on the reference capacitor exceeds an upper limit voltage, which is lower than the power supply, allows the reference capacitor to share a part of charges with the capacitor to be measured, when the voltage on the reference capacitor exceeds the upper limit voltage, in a status when the charge is blocked from being supplied to the reference capacitor, discharges at least a part of the charges which are shared with the capacitor to be measured at least one time, and stops the sharing and the discharging when the voltage on the reference capacitor is lower than the lower limit voltage; and
  an electrostatic capacity change sensing unit that senses the change in the electrostatic capacity in the capacitor to be measured using at least one of the number of sharing times and the number of discharging times,
  wherein the charging/discharging controller compares the voltage on the reference capacitor with the upper limit voltage and the lower limit voltage, inverts a comparison result with the upper limit voltage, logically operates the lower limit voltage and the inverted comparison result with the upper limit voltage, and maintains the charging of the reference capacitor and the blocking of the reference capacitor to be discharged when the voltage on the reference capacitor is between the upper limit voltage and the lower limit voltage, based on the logical operation result to charge the reference capacitor.

13. The apparatus of claim 12, wherein the charging/discharging controller controls the charging of the reference capacitor, the sharing of the charge, and the discharging of the shared charge, and the stopping of the sharing and the discharging of the shared charge based on the logical operation on the comparison result of the voltage on the reference capacitor with the upper limit voltage and the comparison result of the voltage on the reference capacitor with the lower limit voltage.

14. The apparatus of claim 13, wherein the charging/discharging controller includes an SR latch that performs the logical operation.

15. The apparatus of claim 12, wherein the charging/discharging controller stops the charging of the reference capacitor and starts sharing the charge between the capacitor to be measured and the reference capacitor and discharging the shared charge, when the voltage on the reference capacitor exceeds the upper limit voltage, based on the logical operation result.

16. The apparatus of claim 12, wherein the charging/discharging controller discharges the shared charge in a status when the charge is blocked from being shared.

17. The apparatus of claim 12, wherein the charging/discharging controller includes a passive impedance that is provided on a discharging path of the shared charge to delay the discharging of the shared charge.

18. The apparatus of claim 12, wherein the charging/discharging controller compares the voltage on the reference capacitor with the upper limit voltage and the lower limit voltage, inverts the comparison result with the upper limit voltage, logically operates the lower limit voltage and the inverted comparison result with the upper limit voltage, and maintains the sharing of the charge between the capacitor to be measured and the reference capacitor and the discharging of the shared charge and maintains the blocking of the charge from being supplied to the reference capacitor, when the voltage on the reference capacitor is between the upper limit voltage and the lower limit voltage, based on the logical operation result
to allow a part of the charges of the reference capacitor to be shared with the capacitor to be measured and discharge at least a part of the charges shared with the capacitor to be measured.

19. The apparatus of claim 18, wherein the charging/discharging controller stops sharing the charge between the capacitor to be measured and the reference capacitor and discharging the shared charge and starts charging the reference capacitor in a status when the discharging of the reference capacitor is blocked, when the voltage on the reference capacitor is lower than the lower limit voltage, based on the logical operation result.

20. The apparatus of claim 12, further comprising:
  a counter that counts at least one of the number of sharing times and the number of discharging times,
  wherein the counter is enabled by a signal that stops the charging of the reference capacitor.

21. The apparatus of claim 12, further comprising:
a counter that counts at least one of the number of sharing times and the number of discharging times,
wherein the counter is enabled by a signal that shares the charge and discharge the shared charge.

22. The apparatus of claim 12, wherein the charging/discharging controller resets the reference capacitor before charging the reference capacitor.

23. A non-transitory recording medium in which a program that implements a method of sensing a change in an electrostatic capacity in a capacitor to be measured is recorded, the method comprising:
a step of charging a reference capacitor by applying a power supply to the reference capacitor, in a status when the discharging of the reference capacitor is blocked;
a step of stopping charging of the reference capacitor when a voltage on the reference capacitor exceeds an upper limit voltage, which is lower than the power supply;
a step of sharing a part of charges of the reference capacitor with the capacitor to be measured;
a step of discharging at least a part of the charges shared with the capacitor to be measured;
a step of repeating at least one of the step of sharing a part of charges of the reference capacitor with the capacitor to be measured and the step of discharging at least a part of the charges shared with the capacitor to be measured until the voltage on the reference capacitor becomes lower than a lower limit voltage;
a step of stopping the sharing and the discharging when the voltage on the reference capacitor is lower than the lower limit voltage; and
a step of sensing the change in the electrostatic capacity in the capacitor to be measured using at least one of the number of sharing times and the number of discharging times,
wherein the step of charging the reference capacitor by applying a power supply to the reference capacitor includes:
a step of comparing the voltage on the reference capacitor with the upper limit voltage and the lower limit voltage;
a step of inverting a comparison result with the upper limit voltage;
a step of logically operating the lower limit voltage and the inverted comparison result with the upper limit voltage; and
a step of maintaining the charging of the reference capacitor and the blocking the reference capacitor from being discharged, when the voltage on the reference capacitor is between the upper limit voltage and the lower limit voltage, based on the logical operation result.

24. The non-transitory recording medium of claim 23, wherein a program that implements a touch sensing method including the electrostatic capacity change sensing method is recorded.

* * * * *